US010728546B2

(12) United States Patent
Leontaris et al.

(10) Patent No.: US 10,728,546 B2
(45) Date of Patent: Jul. 28, 2020

(54) SAMPLE ADAPTIVE OFFSET SYSTEMS AND METHODS

(71) Applicant: APPLE INC., Cupertino, CA (US)

(72) Inventors: Athanasios Leontaris, Cupertino, CA (US); Ponan Kuo, Sunnyvale, CA (US); Heon-Mo Koo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1017 days.

(21) Appl. No.: 15/017,286

(22) Filed: Feb. 5, 2016

(65) Prior Publication Data

US 2017/0230656 A1    Aug. 10, 2017

(51) Int. Cl.
| | |
|---|---|
| *H04N 19/117* | (2014.01) |
| *H04N 19/40* | (2014.01) |
| *H04N 19/14* | (2014.01) |
| *H04N 19/593* | (2014.01) |
| *H04N 19/503* | (2014.01) |
| *H04N 19/82* | (2014.01) |
| *H04N 19/176* | (2014.01) |
| *H04N 19/147* | (2014.01) |

(52) U.S. Cl.
CPC ........... *H04N 19/117* (2014.11); *H04N 19/14* (2014.11); *H04N 19/147* (2014.11); *H04N 19/176* (2014.11); *H04N 19/82* (2014.11)

(58) Field of Classification Search
CPC .... H04N 19/117; H04N 19/14; H04N 19/147; H04N 19/176; H04N 19/82
USPC .................................................... 375/240.14
See application file for complete search history.

(56) References Cited

U.S. PATENT DOCUMENTS

| | | |
|---|---|---|
| 9,106,888 B2 | 8/2015 | Chou |
| 9,215,472 B2 | 12/2015 | Orr et al. |
| 9,218,639 B2 | 12/2015 | Cote et al. |
| 9,224,186 B2 | 12/2015 | Rygh et al. |
| 9,224,187 B2 | 12/2015 | Cote et al. |
| 9,270,999 B2 | 2/2016 | Cote et al. |
| 9,292,899 B2 | 3/2016 | Schaub et al. |
| 9,299,122 B2 | 3/2016 | Okruhlica et al. |
| 9,305,325 B2 | 4/2016 | Cheng et al. |
| 9,336,558 B2 | 5/2016 | Cote et al. |
| 9,351,003 B2 | 5/2016 | Cote et al. |
| 9,380,312 B2 | 6/2016 | Cote et al. |
| 2012/0294353 A1* | 11/2012 | Fu .......................... H04N 19/70 375/240.02 |
| 2013/0188741 A1 | 7/2013 | Minoo et al. |

(Continued)

*Primary Examiner* — Matthew K Kwan
(74) *Attorney, Agent, or Firm* — Fletcher Yoder P.C.

(57) ABSTRACT

Systems and methods for improving operation of a video encoding pipeline, which includes a sample adaptive offset block that selects an offset sample from image data corresponding with a coding unit; determines edge offset parameters including a first mapping of an edge classification to an edge offset value and band offset parameters including a second mapping of a band classification to a band offset value based at least in part on analysis of the offset sample; and determines sample adaptive offset parameters based at least in part on a first rate-distortion cost associated with the edge offset parameters and a second rate-distortion cost associated with the band offset parameters. Additionally, a decoding device may apply offsets to decoded image data corresponding with the coding unit based at least in part on the sample adaptive offset parameters.

21 Claims, 15 Drawing Sheets

(56) References Cited

U.S. PATENT DOCUMENTS

| | | |
|---|---|---|
| 2014/0301480 A1 | 10/2014 | Francois et al. |
| 2014/0369429 A1 | 12/2014 | Laroche et al. |
| 2015/0010052 A1 | 1/2015 | Mody et al. |
| 2015/0092833 A1 | 4/2015 | Ku et al. |
| 2015/0092843 A1 | 4/2015 | Millet et al. |
| 2015/0092855 A1 | 4/2015 | Chou et al. |
| 2015/0124866 A1 | 5/2015 | Fu et al. |
| 2016/0007038 A1 | 1/2016 | Chou et al. |
| 2016/0021385 A1 | 1/2016 | Chou et al. |
| 2016/0065969 A1 | 3/2016 | Cheng |
| 2016/0065973 A1 | 3/2016 | Cote et al. |
| 2016/0323594 A1* | 11/2016 | Sun ................ H04N 19/157 |
| 2017/0006283 A1* | 1/2017 | Zhou ............... H04N 19/1883 |

* cited by examiner

SAMPLE ADAPTIVE OFFSET SYSTEMS AND METHODS

BACKGROUND

The present disclosure generally relates to image data encoding and, more particularly, to determining sample adaptive offset parameters applied to decoded image data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Often, an electronic device may present visual representations of information as image frames displayed on an electronic display based on image data. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of display pixels based on the decoded image data.

To facilitate encoding, prediction techniques may be used to encode source image data. For example, since an image frame may change gradually, intra-frame prediction techniques may be used to indicate image data of a first portion of the image frame by referencing image data of a second portion of the image frame. Additionally, since successively displayed image frames may change gradually, inter-frame prediction techniques may be used to indicate image data with reference to image data in other image frames. In other words, instead of directly compressing, source image data may be encoded with reference to other image data, thereby producing encoded image data.

A decoding device may then decode the encoded image data to generate decoded image data. For example, the decoding device may display an image frame based on the decoded image data. However, encoding using prediction techniques may result still result in some variations between the source image data and the decoded image data, which may be perceivable as visual artifacts in the displayed image frame.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to encoding source image data, which may enable reducing transmission bandwidth and/or memory usage. For example, a video encoding pipeline may use prediction techniques (e.g., inter-frame prediction techniques and/or intra-frame prediction techniques) to encode the source image data. In some embodiments, utilizing the prediction techniques, the video encoding pipeline may determine encoded image data by indicating the source image data with reference to other image data (e.g., image data in the same image frame and/or image data in other image frames).

A decoding device may then decode the encoded image data to determine decoded image data for use in the decoding device. For example, the decoding device may display an image frame based on the decoded image data. However, using prediction techniques may cause variations between the decoded image data and the source image data, which may perceivable as visual artifacts in the displayed image frame.

As such, the video encoding pipeline may determine filtering parameters that may be applied to the decoded image data to reduce likelihood of perceivable artifacts in the displayed image frame. In some embodiments, the filtering parameters may include deblock filtering parameters (e.g., a boundary strength parameter) that may be applied to decoded image data to reduce likelihood of perceivable blocking in the displayed image frame. Additionally, in some embodiments, the filtering parameters may include sample adaptive offset parameters (e.g., whether to apply offsets, types of offsets to apply, classifications for which to apply offsets, and/or value of the offsets).

To facilitate determining the sample adaptive offset parameters, the video encoding pipeline may determine reconstructed image data that indicates decoded image data expected to be determined by the decoding device. Additionally, the video encoding pipeline may determine deblocked image data by applying the deblock filtering parameters to the reconstructed image data. In some embodiments, to facilitate reducing blocking, the deblocked image data may be generated based on samples of reconstructed image data surrounding a boundary of a coding unit (e.g., a coding tree unit). In other words, in such embodiments, the video encoding pipeline may determine the deblocked image data corresponding with the coding unit based at least in part on reconstructed image data neighboring the coding unit.

However, in some embodiments, some neighboring reconstructed image data may be determined before processing the coding unit while other neighboring reconstructed image data may be determined after processing the coding unit, for example, when the video encoding pipeline processes coding units in raster scan order. In other words, in such embodiments, some neighboring (e.g., left, top, and/or top-left) reconstructed image data may be available for determining deblocked image data while processing the coding unit while other neighboring (e.g., right, bottom, and/or bottom-right) reconstructed image data may not be available until the video encoding pipeline processes a subsequent coding unit. As such, there may be some delay between determining deblocked image data corresponding with a first portion of the coding unit and deblocked image data corresponding with a second portion of the coding unit.

To reduce computation complexity, the video encoding pipeline may determine sample adaptive offset parameters using deblocked image data in the first portion of the coding unit and reconstructed image data in the second portion of the coding unit. In this manner, the video encoding pipeline may reduce the effect the delay between determining deblock image data in the first portion and the second portion has on duration used to determine the sample adaptive offset parameters.

To determine the sample adaptive offset parameters, the video encoding pipeline may determine an offset sample from the deblocked image data and the reconstructed image data corresponding with the coding unit. As used herein, an "offset sample" is intended to describe image data in a coding unit (e.g., coding tree unit) used to determine (e.g., estimate) sample adaptive offset parameters for the coding unit. In some embodiments, the offset sample may be less than the total amount of deblocked image data and reconstructed image data to facilitate reducing computation complexity for determining the sample adaptive offset parameters. Additionally, in some embodiments, the size, shape, and/or location of the offset sample may be dynamically adjusted to improve quality/reliability (e.g., ability to reduce likelihood of perceivable visual artifacts) of the sample adaptive offset parameters. For example, the offset sample may be selected to select an important portion of the coding unit, which is expected to be representative of a majority of the coding unit. Additionally or alternatively, the offset sample may be selected to exclude a noisy portion (e.g., closed captioning text) of the coding unit, which is expected to differ from the majority of the coding unit.

In some embodiments, the sample adaptive offset parameters may include band offset parameters and/or edge offset parameters that may be applied to decoded image data to reduce perceivability of some types of artifacts. For example, band offset parameters may be applied to reduce perceivability of banding and edge offset parameters may be applied to reduce perceivability of ringing along an edge (e.g., a line). Thus, to improve quality/reliability of the sample adaptive offset parameters, the offset sample may include a band offset sample used to determine the band offset parameters and an edge offset sample used to determine the edge offset parameters. As used herein, a band offset sample is intended to describe image data in a coding unit (e.g., coding tree unit) used to determine (e.g., estimate) band offset parameters for the coding unit and an edge offset sample is intended to describe image data in a coding unit (e.g., coding tree unit) used to determine (e.g., estimate) edge offset parameters for the coding unit.

For example, the band offset sample may be selected to include locations (e.g., sky) in the coding unit that are likely to include artifacts (e.g., banding) correctable by the band offset parameters. Additionally, the edge offset sample may be selected to include locations (e.g., edges) in the coding unit that are likely to include artifacts (e.g., ringing) correctable by the edge offset parameters. In some embodiments, since location of the artifacts correctable by each may vary, the band offset sample and the edge offset sample may each be independently adjustable and, thus, possibly vary from one another.

Additionally, in some embodiments, the video encoding pipeline may select the sample adaptive offset parameters from multiple candidates, which include the edge offset parameters and/or the band offset parameters, based on rate-distortion cost associated with each candidate. Thus, the video encoding pipeline may determine an edge offset rate-distortion cost associated with the edge offset parameters and/or a band offset rate-distortion cost associated with the band offset parameters.

In some embodiments, the rate-distortion cost associated with a candidate may be determined based at least in part on an expected rate (e.g., number of bits used to indicate the candidate parameters), a distortion metric that indicates variation between the source image data and the decoded image data, a weighting factor applied to the distortion metric, and/or a biasing factor. In some embodiments, the weighting factor and/or the biasing factor used to determine the rate-distortion cost associated with each candidate may be independently adjustable and, thus, may vary. For example, the band offset weighting factor and/or the edge offset weighting factor may be adjusted based at least in part on a quantization parameter (e.g., a quantizer value) used by the video encoding pipeline to generate the encoded image data. Additionally, the band offset biasing factor and/or the edge offset biasing factor may be adjusted to bias selecting the band offset parameters or the edge offset parameters as the sample adaptive offset parameters.

BRIEF DESCRIPTION OF THE DRAWINGS

Various aspects of this disclosure may be better understood upon reading the following detailed description and upon reference to the drawings in which.

DETAILED DESCRIPTION

Figure 1:
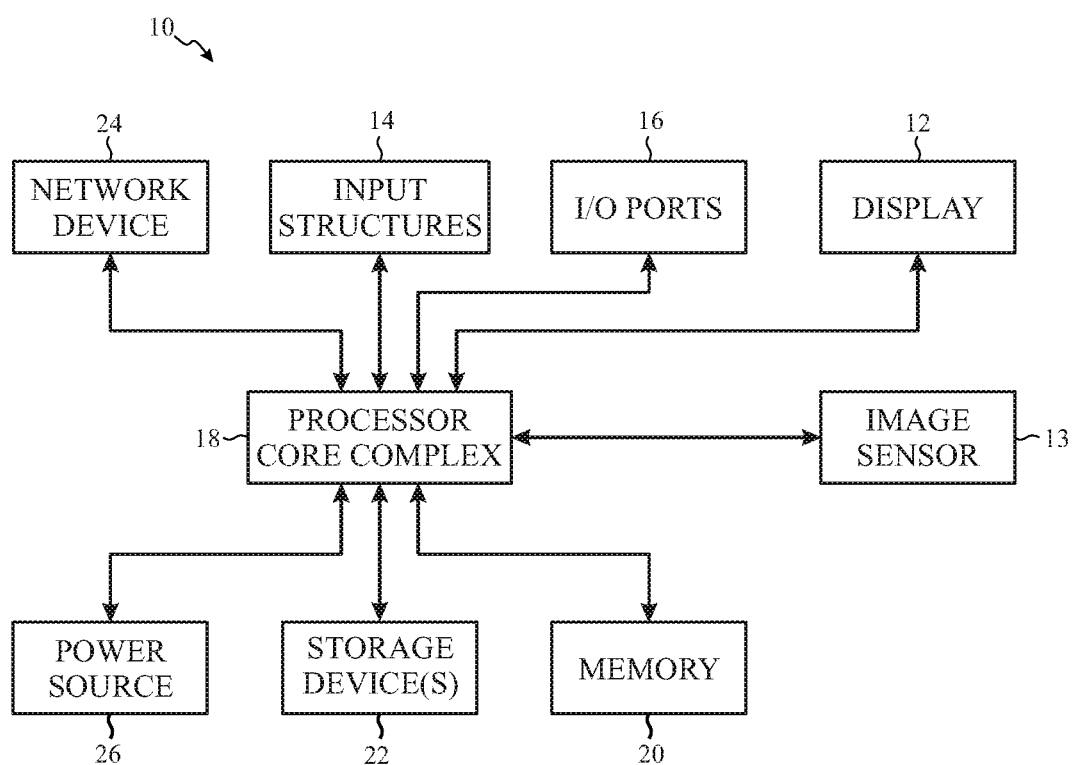
FIG. 1 is a block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic device may facilitate visually presenting information by instructing an electronic display to display image frames based on image data. In some embodiments, the image data may be generated by an image sensor (e.g., digital camera) and stored in the electronic device. Additionally, when the image data is generated external from the electronic display, the image data may be transmitted to the electronic device. To reduce resource usage, image data may be encoded (e.g., compressed) to reduce size (e.g., number of bits) which, for example, may reduce transmission bandwidth and/or memory address usage.

To encode source image data, the video encoding pipeline may determine and implement encoding parameters to encode source image data. For example, to encode source image data of an image frame, the video encoding pipeline may determine prediction technique used to encode each coding tree unit or coding unit in the image frame. As used herein, a "coding unit" is intended to describe a sample of image data corresponding to a group of pixels in an image frame, which is encoded using the same prediction technique (e.g., intra-frame prediction techniques or inter-frame prediction techniques). Additionally, as used herein, a "coding tree unit" is intended to describe a largest permissible coding unit, which may include one or more coding units.

Prediction techniques may facilitate encoding by enabling the source image data to be indicated via reference to other image data. For example, since an image frame may change gradually, the video encoding pipeline may utilize an intra-frame prediction technique to indicate image data with reference to other (e.g., neighboring) image data in the same image frame. Additionally, since successively displayed image frames may change gradually, the video encoding pipeline may utilize an inter-frame prediction technique to indicate image data with reference to image data in other (e.g., previous or subsequent) image frames. In other words, encoded image data may be generated without directly compressing the source image data.

In some instances, this may result in decoded image data determined by decoding the encoded image data to vary from the source image data. Such variations may cause perceivable visual artifacts in an image frame displayed based on the decoded image data. For example, since encoded in rectangular units (e.g., coding units, prediction units, and/or transform units), blocking artifacts may result in the displayed image frame. Additionally, since based on other image data, color and/or brightness artifacts (e.g., banding and/or ringing) may result in the displayed image frame.

To reduce likelihood of perceivable visual artifacts, the decoded image data may be adjusted (e.g., filtered) before being used to display an image frame. For example, the decoded image data may be deblocked to reduce likelihood of perceivable blocking artifacts in the displayed image frame. Additionally, sample adaptive offsets may be applied to the decoded image data to reduce likelihood of perceivable color and/or brightness artifacts in the displayed image frame.

Accordingly, the video encoding pipeline may determine filtering parameters that may be used to adjust the decoded image data. In some embodiments, the filtering parameters may include deblocking parameters, which may be implemented to deblock the decoded image data, and/or sample adaptive offset parameters, which may be implemented to apply offsets to the decoded image data. For example, the deblocking parameters may indicate strength of deblock filtering to apply to the decoded image data. Additionally, the sample adaptive offset parameters may indicate whether to apply offsets, type of offsets (e.g., band offsets or edge offsets) to apply, classifications (e.g., band classifications or edge classifications) for which to apply offsets, and/or value of the offsets.

To facilitate determining the filtering parameters, the video encoding pipeline may mirror operations of a decoding device. As such, the video encoding pipeline may utilize reconstructed image data, which indicates decoded image data expected to be determined by the decoding device. For example, to determine the deblock filtering parameters, the video encoding pipeline may analyze the reconstructed image data to determine strength of blocking expected to occur in the decoded image data. As described above, blocking artifacts may be caused by encoding the source image data in rectangular units. Accordingly, the video encoding pipeline may analyze the reconstructed image data across boundaries of the rectangular units. Based on the deblock filtering parameters, the video encoding pipeline may deblock the reconstructed image data to generate deblocked image data.

Additionally, based at least in part on the deblocked image data, the video encoding pipeline may determine sample adaptive offset parameters. As described above, the deblocked image data may be generated across boundaries of the rectangular units. As such, deblocked image data corresponding with a rectangular unit may be generated based on neighboring rectangular units. For example, to determine deblocked image data corresponding with a coding unit (e.g., coding tree unit), the video encoding pipeline may utilize reconstructed image data corresponding with a top neighboring coding unit, a left neighboring coding unit, a top left neighboring coding unit, a bottom left neighboring coding unit, a bottom neighboring coding unit, a bottom right neighboring coding unit, a right neighboring coding unit, and a top right neighboring coding unit.

However, in some embodiments, the video encoding pipeline may process one coding unit at a time, for example, in raster scan order. As such, reconstructed image data corresponding with some neighboring coding units may be determined before processing a coding unit while reconstructed image data corresponding with other neighboring coding units may be determined after processing the coding unit. Continuing with the above example, reconstructed image data corresponding with the top right neighboring coding unit, the top neighboring coding unit, the top left neighboring coding unit, and the left neighboring coding tree unit may be previously determined. On the other hand, reconstructed image data corresponding with the bottom left neighboring coding unit, the bottom neighboring coding unit, the bottom right neighboring coding unit, and the right neighboring coding unit may be subsequently determined.

Thus, in such embodiments, deblocked image data corresponding with a coding unit may be determined in portions. For example, a first (top left) portion of the coding unit may be determined while processing the coding unit. On the other hand, a second (e.g., bottom and right) portion of the coding unit may be determined while processing subsequent coding units. For example, the deblocked image data corresponding with the right portion of the coding unit may be determined along with the right neighboring coding unit and deblocked image data corresponding with the bottom portion of the coding unit may be determined along with the bottom neighboring coding unit. As such, there may be some delay between determining deblocked image data corresponding with the first portion of the coding unit and determining deblocked image data corresponding with the second portion of the coding unit.

However, in some instances, operating duration of the video encoding pipeline may be limited, for example, to facilitate real-time or near real-time display and/or transmission. In other words, in such instances, operating duration allotted for the video encoding pipeline to determine filtering parameters may be limited. Additionally, in some instances, circuitry size used to implement the video encoding pipeline may be limited, for example, in a hardware implementation. In some embodiments, the operating duration and/or circuitry size (e.g., hardware footprint) may be reduced by reducing computational complexity of the video encoding pipeline.

Accordingly, to facilitate reducing computational complexity, the video encoding pipeline may determine the sample adaptive offset parameters based at least in part on reconstructed image data. As described in the above example, deblocked image data in the first portion of the coding unit may be determined based on previously determined reconstructed image data while deblocked image data of the second portion of the coding unit may be determined based on subsequently determined reconstructed image data. Thus, in some embodiments, the video encoding pipeline may determine the sample adaptive offset parameters based on reconstructed image data in the second portion instead of waiting for deblocked samples to be determined. In this manner, the video encoding pipeline may determine sample adaptive offset parameters at least partially in parallel with the deblocked image data, thereby facilitating reduction in operating duration.

To determine the sample adaptive offset parameters, the video encoding pipeline may select an offset sample from the image data (e.g., deblocked and reconstructed image data) corresponding with the coding unit and analyze the offset sample to determine offset statistics. In some embodiments, the size, shape, and/or location of the offset sample may be dynamically adjusted to improve quality/reliability (e.g., ability to reduce likelihood of perceivable visual artifacts) of the sample adaptive offset parameters and/or computational complexity used to determine the sample adaptive offset parameters. For example, the video encoding pipeline may decrease size of the offset sample to reduce amount of image data processed and, thus, computational complexity of determining the sample adaptive offset parameters.

Additionally, the video encoding pipeline may improve quality/reliability of the sample adaptive offset parameters portion by adjusting portion of the coding unit selected. For example, the video encoding pipeline may adjust the offset sample to select an important portion of the coding unit, which is expected to be representative of a majority of the coding unit. Additionally or alternatively, the video encoding pipeline may adjust the offset sample to exclude a noisy portion (e.g., closed captioning text) of the coding unit, which is expected to differ from the majority of the coding unit. In this manner, determining the sample adaptive parameters based on such an offset sample may increase applicability to the majority of the coding unit, thereby improving quality/reliability of the sample adaptive parameters.

Based at least in part on the offset sample, the video encoding pipeline may select the sample adaptive offset parameters from multiple candidates, such as band offset parameters, edge offset parameters, and offset off parameters. In some embodiments, the video encoding pipeline may determine band offset parameters based at least in part on band offset statistics. To determine the band offset statistics, the video encoding pipeline may determine number of pixels in the offset sample that fall within a band classification. As used herein, a "band classification" is intended to describe a range of magnitudes, for example, luma magnitudes and/or chroma magnitudes.

Additionally, the video encoding pipeline may determine a sum of differences between the pixels in the offset sample that fall within the band classification and corresponding (e.g., co-located) source image data. Based on the number of pixels and the sum of differences, the video encoding pipeline may determine a central band offset candidate, for example, by dividing the sum of differences by the number of pixels that fall within the band classification. Based on the central band offset candidate, the video encoding pipeline may determine a set of band offset candidates, for example, at integer values within a range around the central band offset candidate. The video encoding pipeline may then analyze each band offset candidate in the set and select a band offset to associate with the band classification. In some embodiments, the video encoding pipeline may determine a rate-distortion cost associated with each band offset candidate and select the band offset based at least in part on the rate-distortion costs. In a similar manner, the video encoding pipeline may determine a band offset associated with each of the other band classifications.

Similarly, the video encoding pipeline may determine the edge offset parameters based at least in part on edge offset statistics. To determine the edge offset statistics, the video encoding pipeline may determine number of pixels in the offset sample that fall within an edge classification (e.g., edge class and category pair). As used herein, an "edge class" is intended to describe direction of an edge, for example, zero degrees (horizontal), forty-five degrees, ninety degrees (e.g., vertical), or one hundred thirty-five degrees. Additionally, as used herein a "category" is intended to describe how magnitude of a pixel varies from neighboring pixels along the same edge (e.g., line). As such, the video encoding pipeline may determine whether a pixel falls within an edge classification based at least in part on neighboring pixels.

Additionally, the video encoding pipeline may determine a sum of differences between the pixels that fall within the edge classification and corresponding (e.g., co-located) source image data. Based on the number of pixels and the sum of differences, the video encoding pipeline may determine a central edge offset candidate, for example, by dividing the sum of differences by the number of pixels that fall within the edge classification. Based on the central edge offset candidate, the video encoding pipeline may determine a set of edge offset candidates, for example, at integer values within a range around the central edge offset candidate. The video encoding pipeline may then analyze each edge offset candidate in the set and select an edge offset to associate with the edge classification. In some embodiments, the video encoding pipeline may determine a rate-distortion cost associated with each edge offset candidate and select the edge offset based at least in part on the rate-distortion costs. In a similar manner, the video encoding pipeline may determine an edge offset associated with each of the other edge classifications.

As such, computational complexity for determining the offset statistics (e.g., band offset statistics and/or edge offset statistics) may be dependent on number of offset candidates selected. For example, decreasing number of offset candidates analyzed may facilitate decreasing operating duration and/or circuitry used to determine the sample adaptive offset parameters. Additionally, quality (e.g., ability to reduce likelihood of perceivable visual artifacts) of the offset statistics may be dependent on number of candidates selected. For example, increasing number of offset candidates analyzed may increase average quality of the offset value associated with each classification.

Thus, in some embodiments, the video encoding pipeline may dynamically adjust selection of the offset candidates, for example, to improve quality and/or reduce computation complexity used to determine the band offset statistics. As described above, in some embodiments, the offset candidates may be selected based on a range around the central offset candidate. Thus, in such embodiments, the video encoding pipeline may adjust number of offset candidates selected by adjusting the range. For example, the video encoding pipeline may increase the range to increase number of offset candidates analyzed and/or reduce the range to decrease the number of offset candidates analyzed. Additionally, in some embodiments, the video encoding pipeline may utilize different ranges for selecting the edge offset candidates and the band offset candidates. Furthermore, in some embodiments, the video encoding pipeline may limit value of the offset candidates, for example, to set an upper and/or a lower limit on value of the offset candidates when large offsets are undesirable.

In some embodiments, the video encoding pipeline may select the sample adaptive offset parameters to apply offsets to a subset of classifications (e.g., edge classifications or band classifications). Thus, in such embodiments, the edge offset parameters may include a subset (e.g., group) of possible edge classifications (e.g., edge class and category pairs) for which to apply edge offsets. Similarly, in such embodiments, the band offset parameters may include a subset (e.g., group) of band classifications (e.g., magnitude ranges) for which to apply band offsets.

To determine the edge offset parameters, the video encoding pipeline may determine multiple edge offset parameter candidates. In some embodiments, an edge offset parameter candidate may include a mapping of a group of edge classifications (e.g., edge class and category pairs) to corresponding edge offsets. As such, each edge offset parameter candidate may be selected based at least in part on the edge offset statistics.

Additionally, in some embodiments, each edge offset parameter candidate may be selected to include edge classifications with the same edge class and each category of the edge class. For example, one edge offset parameter candidate may include a first edge classification (e.g., zero degree edge class and category one pair), a second edge classification (e.g., zero edge class and category two pair), a third edge classification (e.g., zero degree edge class and category three pair), and a fourth edge classification (e.g., zero degree edge class and category four pair) The video encoding pipeline may then determine a rate-distortion cost associated with each of the edge offset parameter candidates, for example, based at least in part on an edge offset weighting factor and/or an edge offset biasing factor. Based at least in part on the associated rate-distortion costs, the video encoding pipeline may select the edge offset parameters from the edge offset parameter candidates.

On the other hand, to determine the band offset parameters, the video encoding pipeline may determine multiple band offset parameter candidates. In some embodiments, a band offset parameter candidate may include a mapping of a group of band classifications (e.g., magnitude ranges) to corresponding band offsets. As such, each band offset parameter candidate may be selected based at least in part on the band offset statistics.

Additionally, in some embodiments, each band offset parameter candidate may be selected to include multiple consecutive band classifications. For example, one band offset parameter candidate may include band classification one, band classification two, band classification three, and band classification four. The video encoding pipeline may then determine a rate-distortion cost associated with each band offset parameter candidate, for example, based at least in part on a band offset weighting factor and/or a band offset biasing factor. Based at least in part on the associated rate-distortion costs, the video encoding pipeline may select the band offset parameters from the band offset parameter candidates.

As described above, the video encoding pipeline may then select the sample adaptive offset parameters from multiple candidates. In some embodiments, the candidates may include explicit candidates (e.g., the edge offset parameters, band offset parameters, and/or offset off parameters) and/or merge candidates. The offset off parameters may indicate that sample adaptive offset parameters are not applied. Additionally, the merge candidates may include sample adaptive offset parameters selected for other (e.g., neighboring) coding units. In other words, the sample adaptive offset parameters selected for the current coding unit may be merged from the sample adaptive offset parameters selected for a neighboring coding unit.

In some embodiments, the video encoding pipeline may select the sample adaptive offset parameters from the multiple candidates based at least in part on a rate-distortion cost associated with each candidate. Thus, in such embodiments, the video encoding pipeline may determine the sample adaptive offset parameters based at least in part on an edge offset rate-distortion cost associated with the edge offset parameters and/or a band offset rate-distortion cost associated with the band offset parameters.

In some embodiments, to improve quality/reliability of the sample adaptive offset parameters selected, the video encoding pipeline may dynamically adjust determination of the edge offset rate-distortion cost and/or the band offset rate-distortion cost, for example, by adjusting the edge offset weighting factor, the band offset weighting factor, the edge offset biasing factor, and/or the band offset biasing factor. In some embodiments, the band offset weighting factor and/or the edge offset weighting factor may be adjusted based at least in part on a quantization parameter (e.g., quantizer value) applied to a prediction residual to generate a reconstructed prediction residual.

Additionally, the band offset biasing factor and/or the edge offset biasing factor may be adjusted to bias selection of the band offset parameters or the edge offset parameters as the sample adaptive offset parameters. For example, since an image of the sky may be more prone to banding, the video encoding pipeline may adjust the band offset biasing factor and/or the edge offset biasing factor to bias toward selection of the band offset parameters. On the other hand, as number of edges increase, the video encoding pipeline may adjust the band offset biasing factor and/or the edge offset biasing factor to bias toward selection of the edge offset parameters. In this manner, the video encoding pipeline may improve quality/reliability of the sample adaptive offset parameters by selecting the sample adaptive offset parameters that are more likely to correct perceivable visual artifacts.

To help illustrate, a computing (e.g., electronic) device 10 that may utilize an electronic display 12 to display image frames based on image data and/or an image sensor 13 to capture image data is described in FIG. 1. As will be described in more detail below, the computing device 10 may be any suitable computing device, such as a handheld computing device, a tablet computing device, a notebook computer, and the like. Thus, it should be noted that FIG. 1 is merely one example of a particular implementation and is intended to illustrate the types of components that may be present in the computing device 10.

In the depicted embodiment, the computing device 10 includes the electronic display 12, the image sensor 13, input structures 14, input/output (I/O) ports 16, a processor core complex 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

As depicted, the processor core complex 18 is operably coupled with local memory 20 and the main memory storage device 22. Thus, the processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

The local memory 20 and/or the main memory storage device 22 may be tangible, non-transitory, computer-readable mediums that store instructions executable by and data to be processed by the processor core complex 18. For example, the local memory 20 may include random access memory (RAM) and the main memory storage device 22 may include read only memory (ROM), rewritable non-volatile memory such as flash memory, hard drives, optical discs, and the like. By way of example, a computer program product containing the instructions may include an operating system or an application program.

Additionally, as depicted, the processor core complex 18 is operably coupled with the network interface 24. Using the network interface 24, the computing device 10 may communicatively couple to a network and/or other computing devices. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the computing device 10 to transmit encoded image data to a network and/or receive encoded image data from the network for display on the electronic display 12.

Furthermore, as depicted, the processor core complex 18 is operably coupled with I/O ports 16, which may enable the computing device 10 to interface with various other electronic devices. For example, a portable storage device may be connected to an I/O port 16, thereby enabling the processor core complex 18 to communicate data with a portable storage device. In this manner, the I/O ports 16 may enable the computing device 10 to output encoded image data to the portable storage device and/or receive encoded image data from the portable storage device.

As depicted, the processor core complex 18 is also operably coupled to the power source 26, which may provide power to the various components in the computing device 10. The power source 26 may include any suitable source of energy, such as a rechargeable lithium polymer (Li-poly) battery and/or an alternating current (AC) power converter. Furthermore, as depicted, the processor core complex 18 is operably coupled with input structures 14, which may enable a user to interact with the computing device 10. The inputs structures 14 may include buttons, keyboards, mice, trackpads, and the like. Additionally or alternatively, the electronic display 12 may include touch components that enable user inputs to the computing device 10 by detecting occurrence and/or position of an object touching its screen (e.g., surface of the electronic display 12).

In addition to enabling user inputs, the electronic display 12 may present visual representations of information by display image frames, such as a graphical user interface (GUI) of an operating system, an application interface, a still image, or video content. As described above, the electronic display 12 may display the image frames based on image data. In some embodiments, the image data may be received from other computing devices 10, for example, via the network interface 24 and/or the I/O ports 16. Additionally or alternatively, the image data may be generated by the computing device 10 using the image sensor 13. In some embodiments, image sensor 13 may digitally capture visual representations of proximate physical features as image data.

As described above, the image data may be encoded (e.g., compressed), for example by the computing device 10 that generated the image data, to reduce number of memory addresses used to store and/or bandwidth used to transmit the image data. Once generated or received, the encoded image data may be stored in local memory 20. Accordingly, to display image frames, the processor core complex 18 may retrieve encoded image data from local memory 20, decode the encoded image data, and instruct the electronic display 12 to display image frames based on the decoded image data.

Figure 2:
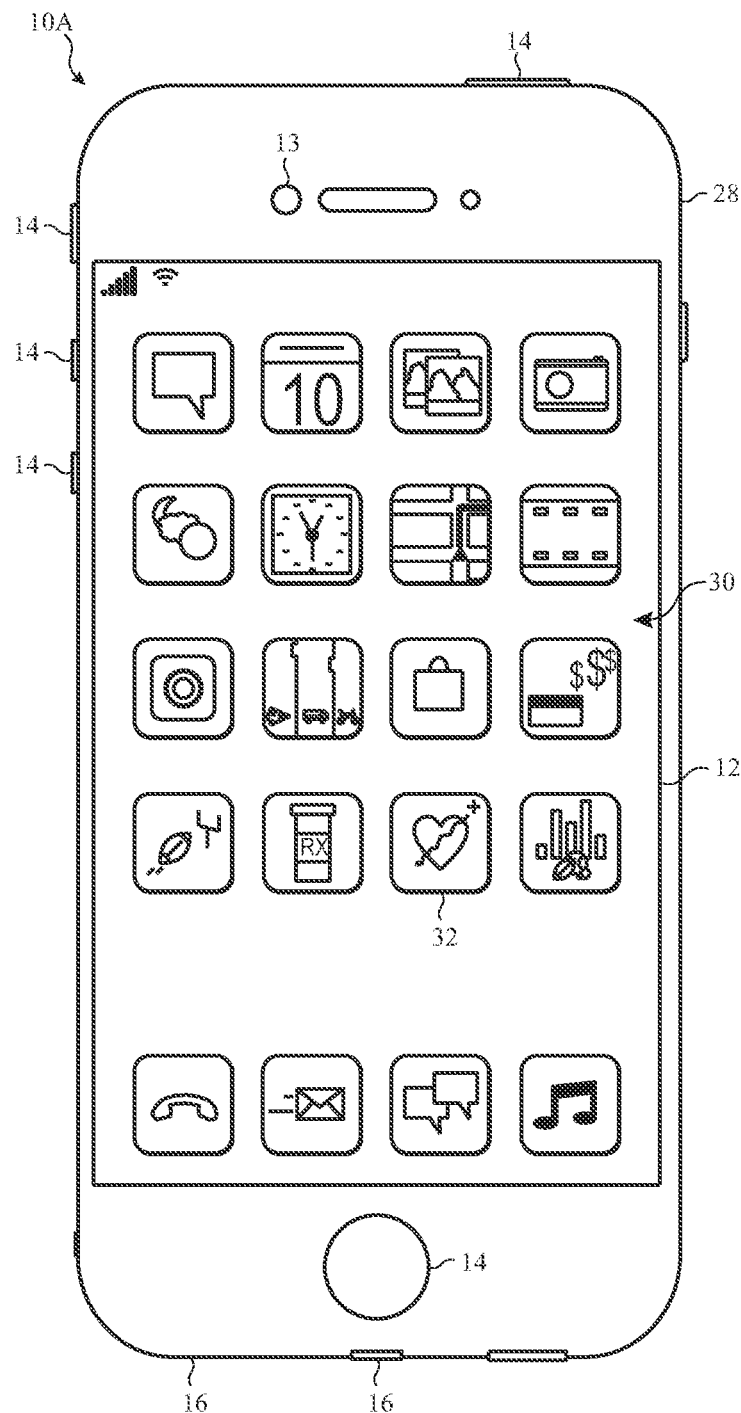
FIG. 2 is an example of the electronic device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and/or shields them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Additionally, as depicted, input structures 14 open through the enclosure 28. As described above, the input structures 14 may enable user interaction with the handheld device 10A. For example, the input structures 14 may activate or deactivate the handheld device 10A, navigate a user interface to a home screen, navigate a user interface to a user-configurable application screen, activate a voice-recognition feature, provide volume control, and/or toggle between vibrate and ring modes. As depicted, I/O ports 16 also open through the enclosure 28. In some embodiments, the I/O ports 16 may include an audio jack to connect to external devices. Furthermore, as depicted, the image sensor 13 opens through the enclosure 28. In some embodiments, the image sensor 13 may include a digital camera that captures image data.

Figure 3:
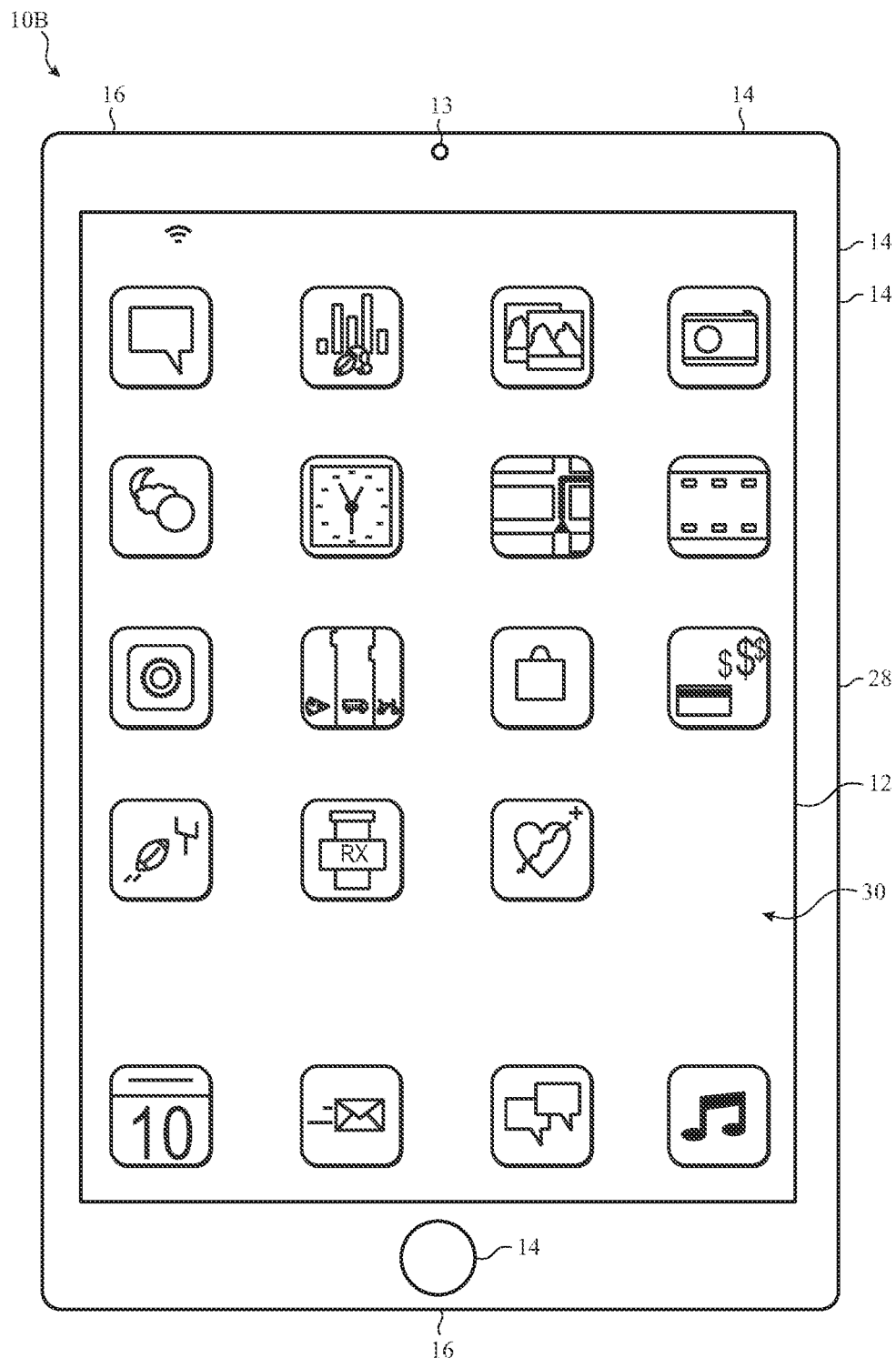
FIG. 3 is an example of the electronic device of FIG. 1, in accordance with an embodiment.
Figure 4:
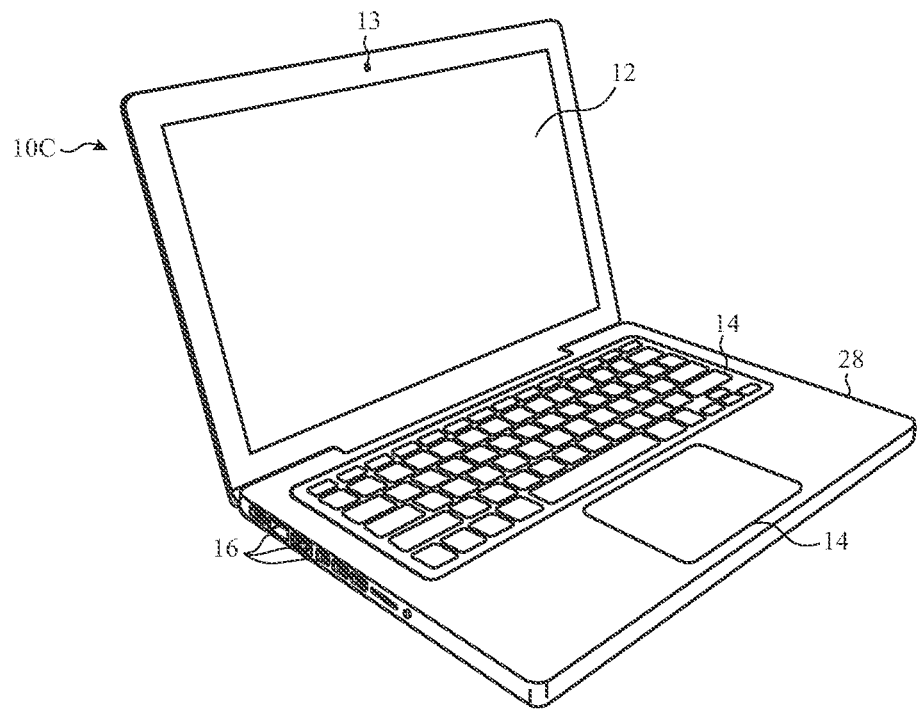
FIG. 4 is an example of the electronic device of FIG. 1, in accordance with an embodiment.
Figure 5:
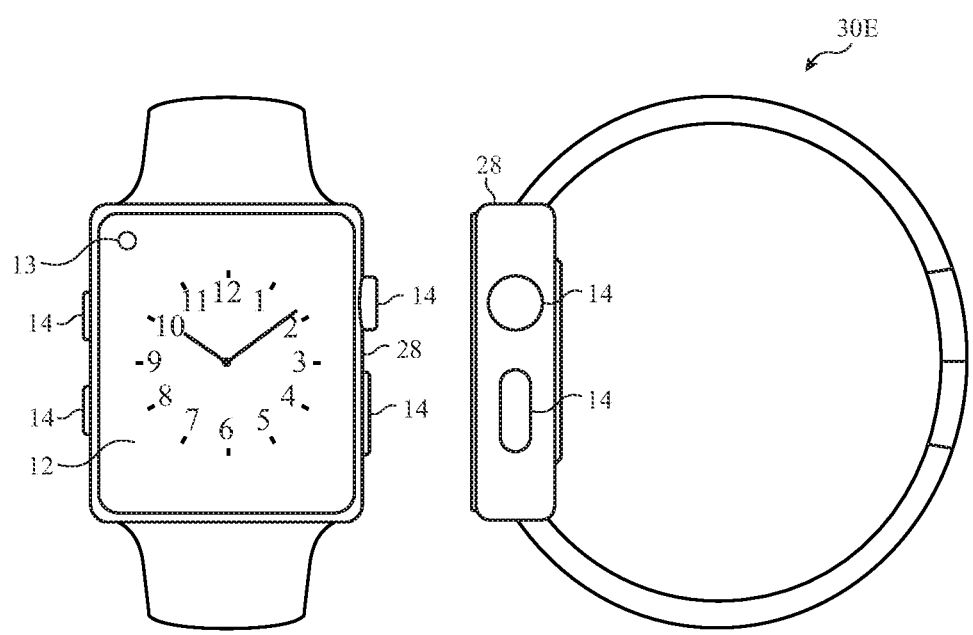
FIG. 5 is an example of the electronic device of FIG. 1, in accordance with an embodiment.

To further illustrate a suitable computing device 10, a tablet device 10B is described in FIG. 3. For example, the tablet device 10B may be any iPad® model available from Apple Inc. Additionally, in other embodiments, the computing device 10 may take the form of a computer 10C as described in FIG. 4. For example, the computer 10C may be any Macbook® or iMac® model available from Apple Inc. Furthermore, in other embodiments, the computing device 10 may take the form of a watch 10D as described in FIG. 5. For example, the watch 10D may be any Apple Watch® model available from Apple Inc. As depicted, the tablet device 10B, the computer 10C, and the watch 10D may each also include an electronic display 12, an image sensor 13, input structures 14, I/O ports 16, an enclosure 28, or any combination thereof.

As described above, source image data may be encoded (e.g., compressed) to reduce resource usage. Additionally, in some embodiments, the duration between generation of image data and display of image frames based on the image data may be limited to enable real-time or near real-time display and/or transmission of generated image frames. For example, image data captured by the image sensor 13 may be displayed on the electronic display 12 with minimal delay to enable a user to determine physical features proximate the image sensor 13 in real-time or near real-time. Additionally, image data generated by the computing device 10 (e.g., by the image sensor 13) may be transmitted (e.g., broadcast) to one or more other computing devices 10 to enable a real-time or near real-time streaming. To enable real-time or near real-time transmission and/or display, duration available to encode source image data may be limited, particularly as resolution of image frames and/or refresh rates of electronic displays 12 increase.

Furthermore, size of circuitry used to implement the video encoding pipeline 34 may be limited, particularly in a mobile device. In some embodiments, reducing computational complexity of the video encoding pipeline 34 may facilitate reducing operating duration and/or circuitry size.

Figure 6:
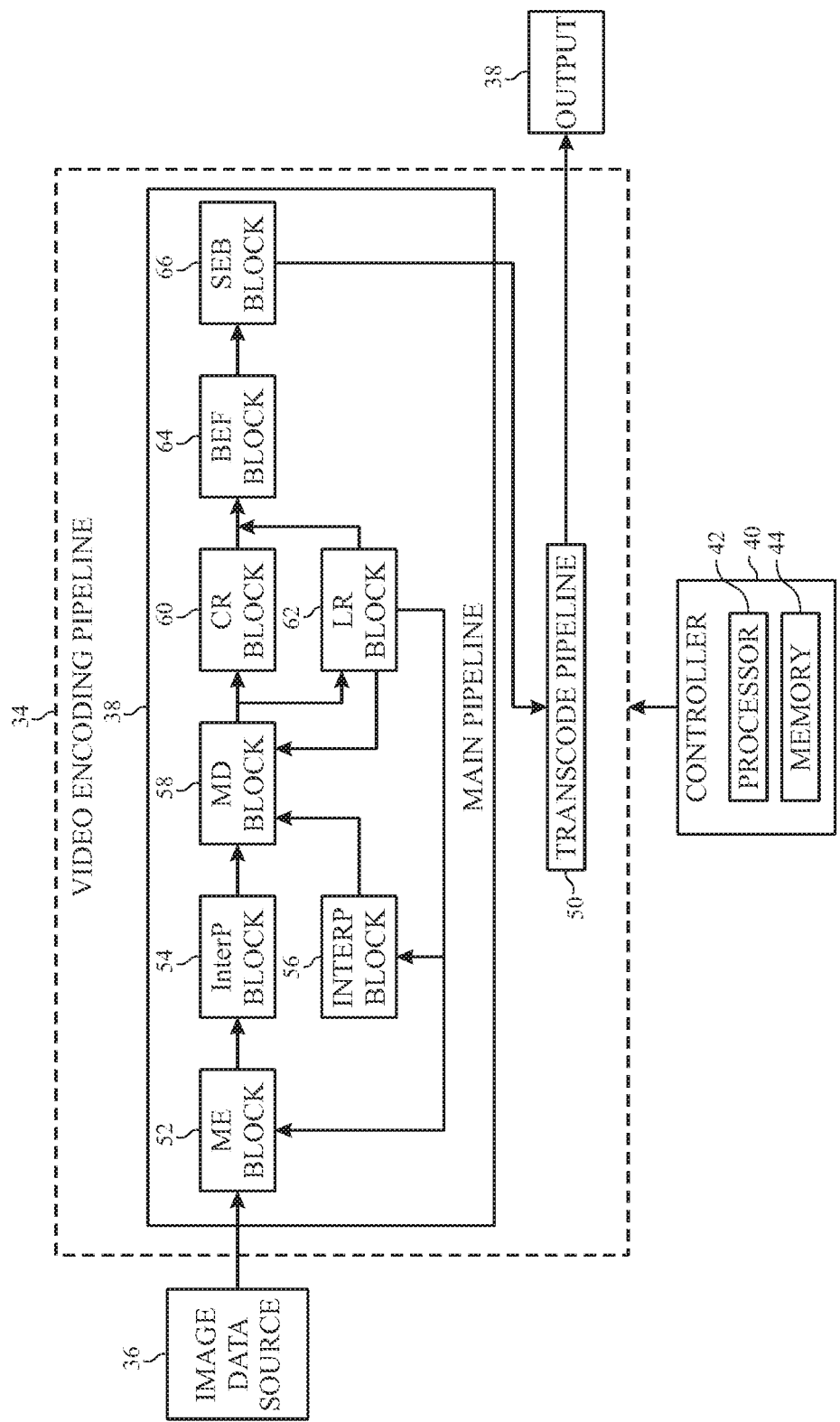
FIG. 6 is block diagram of a video encoding pipeline used to encode source image data, in accordance with an embodiment.

One embodiment of a video encoding pipeline 34 that may be used to encode source image data is described in FIG. 6. As depicted, the video encoding pipeline 34 is communicatively coupled to an image data source 36, an output 38, and a controller 40. In the depicted embodiment, the controller 40 may generally control operation of image data source 36, the video encoding pipeline 34, and/or the output 38. Although depicted as a single controller 40, in other embodiments, one or more separate controllers 40 may be used to control operation of the image data source 36, the video encoding pipeline 34, the output 38, or any combination thereof.

To facilitate controlling operation, the controller 40 may include a controller processor 42 and controller memory 44. In some embodiments, the controller processor 42 may execute instructions and/or process data stored in the controller memory 44 to control operation of the image data source 36, the video encoding pipeline 34, and/or the output 38. In other embodiments, the controller processor 42 may be hardwired with instructions that control operation in the image data source 36, the video encoding pipeline 34, and/or the output 38 when executed. Additionally, in some embodiments, the controller processor 42 may be included in the processor core complex 18 and/or separate processing circuitry (e.g., in the electronic display) and the controller memory 44 may be included in local memory 20, main memory storage device 22, and/or a separate, tangible, non-transitory computer-readable medium (e.g., in the electronic display).

As depicted, the video encoding pipeline 34 is communicatively coupled to the image data source 36. In this manner, the video encoding pipeline 34 may receive source image data from the image data source 36. Thus, in some embodiments, the image data source 36 may be the image sensor 13 and/or any other suitable device that generates source image data.

Additionally, as depicted, the video encoding pipeline 34 is communicatively coupled to the output 38. In this manner, the video encoding pipeline 34 may output encoded (e.g., compressed) image data to the output 38, for example, for storage and/or transmission. Thus, in some embodiments, the output 38 may include the local memory 20, the main memory storage device 22, the network interface 24, the I/O ports 16, the controller memory 44, or any combination thereof.

To facilitate generating encoded image data, the video encoding pipeline 34 may include multiple parallel pipelines. For example, in the depicted embodiment, the video encoding pipeline 34 includes a main pipeline 48 and a transcode pipeline 50. As will be described in more detail below, the main pipeline 48 may encode source image data using prediction techniques (e.g., inter-frame prediction techniques or intra-frame prediction intra-frame prediction techniques) and the transcode pipeline 50 may subsequently entropy encode syntax elements that indicate encoding parameters (e.g., quantization coefficients, inter-frame prediction modes, intra-frame prediction modes, and/or skip modes) used to prediction encode (e.g., encode using prediction techniques) the image data.

To facilitate prediction encoding source image data, the main pipeline 48 may perform various functions. To simplify discussion, the functions are divided between various blocks (e.g., circuitry or modules) in the main pipeline 48. In the depicted embodiment, the main pipeline 48 includes a motion estimation (ME) block 52, an inter-frame prediction (InterP) block 54, an intra-frame prediction (IntraP) block 56, a mode decision (MD) block 58, a chroma reconstruction (CR) block 60, a luma reconstruction (LR) block 62, a back-end-filter (BEF) block 64, and a syntax element binarization (SEB) block 66.

As depicted, the motion estimation block 52 is communicatively coupled to the image data source 36. In this manner, the motion estimation block 52 may receive source image data from the image data source 36, which may include a luma component (e.g., Y) and two chroma components (e.g., Cr and Cb). In some embodiments, the motion estimation block 52 may process one coding unit at a time. As used herein a "luma coding block" is intended to describe a luma component of a coding unit and a "chroma coding block" is intended to describe a chroma component of a coding unit. In other words, a coding unit may include a luma coding block per luma component and a chroma coding block per chroma component.

In some embodiments, the luma coding block may be the same resolution as the coding unit. On the other hand, the chroma coding blocks may vary in resolution based on chroma sampling format. For example, using a 4:4:4 sampling format, the chroma coding blocks may be the same resolution as the coding unit. However, the chroma coding blocks may be half (e.g., half resolution in the horizontal direction) the resolution of the coding unit when a 4:2:2 sampling format is used and a quarter the resolution (e.g., half resolution in the horizontal direction and half resolution in the vertical direction) of the coding unit when a 4:2:0 sampling format is used.

It should be appreciated that, while certain examples of particular coding units, prediction units, and transform units are described below, any suitable block sizes may be used. For example, while 16×16 or 32×32 coding units, prediction units, and transform units are discussed below, other sizes may be 64×64 or 128×128 or greater. Moreover, while the coding units, prediction units, and transform units are described as squares, other geometries may be used. For example, in other embodiments, the coding units, prediction units, and transform units may be 16×32 or 128×64.

As described above, a coding unit may include one or more prediction units, which each includes a luma prediction block per chroma component (e.g., Y) and a chroma prediction block per chroma component (e.g., Cr and Cb). Similar to the luma coding block, a luma prediction block may be the same resolution as the prediction unit. On the other hand, similar to the chroma coding blocks, a chroma prediction block may vary in resolution from the prediction unit based on chroma sampling format.

In some embodiments, the luma prediction block may be encoded using the same luma prediction mode and the chroma prediction block may be encoded using the same chroma prediction mode. Accordingly, in some embodiments, the prediction mode used to encode the luma prediction block and the chroma prediction blocks of a prediction unit may be separately determined. For example, in the depicted embodiment, the motion estimation block 52 may determine candidate luma inter-frame prediction modes that can be used to encode a luma prediction block. As described above, an inter-frame prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate luma inter-frame prediction mode, the motion estimation block 52 may search reconstructed luma image data of other image frames, which may be fed back from the luma reconstruction block 62. For example, the motion estimation block 52 may determine reference samples for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between the luma prediction block and luma of the reference sample. Additionally or alternatively, the match metric may be the sum of absolute transformed difference (SATD) between the luma prediction block and the luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are sufficiently similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to position of the prediction unit in the current frame. In some embodiments, the motion vector may be expressed as (mvX, mvY), where mvX is horizontal offset and mvY is a vertical offset between the prediction unit and the reference sample.

In this manner, the motion estimation block 52 may determine candidate luma inter-frame prediction modes (e.g., reference index and motion vector) for one or more luma prediction blocks in the coding unit. The motion estimation block 52 may then input candidate luma inter-frame prediction modes to the inter-frame prediction block 54. Based at least in part on the candidate luma inter-frame prediction modes, the inter-frame prediction block 54 may determine luma prediction samples.

In some embodiments, the inter-frame prediction block 54 may determine a luma prediction sample by applying motion compensation to a reference sample indicated by a candidate inter-frame prediction mode. For example, the inter-frame prediction block 54 may apply motion compensation by determining luma of the reference sample at fractional (e.g., quarter or half) pixel positions. The inter-frame prediction block 54 may then input the luma prediction sample and corresponding candidate luma inter-frame prediction mode to the mode decision block 58 for consideration. In some embodiments, the inter-frame prediction block 54 may sort the candidate luma inter-frame prediction modes based on associated mode cost and input only a specific number to the mode decision block 58.

In addition to the candidate inter-frame prediction modes, the mode decision block 58 may consider one or more candidate luma intra-frame predictions modes and/or a skip mode. In some embodiments, the skip mode may skip prediction encoding of the source image data. Additionally, in some embodiments, the main pipeline 48 may be capable of using multiple (e.g., 17 or 35) different intra-frame prediction modes. In the depicted embodiment, the intra-frame prediction block 56 may determine the candidate luma intra-frame prediction modes from the multiple possible intra-frame prediction modes.

Additionally, the intra-frame prediction block 56 may determine a luma prediction sample corresponding with each candidate luma intra-frame prediction mode. In some embodiments, the intra-frame prediction block 56 may determine a luma prediction sample by applying the candidate luma intra-frame prediction mode based on neighboring (e.g., top, top right, left, top left, or bottom left) reconstructed luma image data. For example, utilizing a vertical prediction mode, the intra-frame prediction block 56 may set each column of a luma prediction sample equal to reconstructed luma image data of a pixel directly above the column. Additionally, utilizing a DC prediction mode, the intra-frame prediction block 45 may set a luma prediction sample equal to an average of reconstructed luma image data of pixels adjacent the luma prediction block. The intra-frame prediction block 56 may then input candidate luma intra-frame prediction modes and corresponding luma prediction samples to the mode decision block 58 for consideration. In some embodiments, the intra-frame prediction block 56 may sort the candidate luma intra-frame prediction modes based on associated mode cost and input only a specific number to the mode decision block 58.

The mode decision block 58 may determine encoding parameters used to encode the source image data (e.g., coding block). In some embodiments, the encoding parameters for a coding block may include prediction technique (e.g., intra-prediction techniques or inter-frame prediction techniques) for the coding block, number of prediction units in the coding block, size of the prediction units, luma prediction mode (e.g., intra-prediction modes or inter-frame prediction modes) for each of the luma prediction blocks, number of transform units in the coding block, size of the transform units, whether to split the coding unit into smaller coding units, or any combination thereof.

To facilitate determining the encoding parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each coding unit in the image frame may be prediction encoded using intra-frame prediction techniques.

On the other hand, in a P-frame or B-frame, source image data may be encoded by referencing image data used to display the same image frame and/or a different image frames. More specifically, in a P-frame and in a B-frame, source image data may be encoded by referencing image data used to display a previous image frame and/or image data used to display a subsequently image frame. Accordingly, when the image frame is a P-frame or a B-frame, the mode decision block 58 may determine that each coding unit in the image frame may be prediction encoded using either intra-frame techniques or inter-frame techniques.

Although using the same prediction technique, the configuration of luma prediction blocks in a coding unit may vary. For example, the coding unit may include a variable number of prediction units, which each uses different prediction modes, at variable locations in the coding unit. Thus, in some embodiments, the mode decision block may evaluate multiple candidate prediction mode configurations. As used herein a "prediction mode configuration" is intended to describe number, size, and location of prediction units; number, size, and location of transform units; and prediction mode of luma prediction blocks in a coding unit. Thus, the mode decision block 58 may determine a candidate luma inter-frame prediction mode configuration using one or more of the candidate luma inter-frame prediction modes received from the inter-frame prediction block 54. Additionally, the mode decision block 58 may determine a candidate luma intra-frame prediction mode configuration using one or more of the candidate luma intra-frame prediction modes received from the intra-frame prediction block 56.

Since a coding block may utilize the same prediction technique, the mode decision block 58 may determine a prediction technique for a coding unit by comparing rate-distortion cost associated with the candidate luma prediction mode configurations and/or the skip mode. In some embodiments, the rate-distortion cost may be as follows:

$$RD=A(\text{rate\_cost})+B(\text{distortion\_cost})+C \quad (1)$$

where RD is the rate-distortion cost, rate_cost is an estimated rate (e.g. number of bits), distortion cost is a distortion metric (e.g., sum of squared difference), A is a weighting factor for the estimated rate, B is a weighting factor for the distortion metric, and C is a bias factor.

In some embodiments, the distortion metric may indicate amount of expected distortion in decoded image data when a candidate luma prediction mode configuration is implemented. Accordingly, in some embodiments, the distortion metric may be a sum of squared difference (SSD) between source luma image data and a corresponding reconstructed luma image data, which may be fed back from the luma reconstruction block 62. As described above, the reconstructed luma image data may indicate decoded image data expected to be determined by a decoding device.

Additionally, in some embodiments, the estimated rate may be number of bits expected to be used to indicate a candidate prediction mode configuration. For example, the estimated rate of an intra-frame prediction mode configuration may include expected number of bits used to indicate the intra-frame prediction technique (e.g., coding unit overhead), the luma intra-frame prediction modes, luma prediction residuals, and/or a transform unit split. On the other hand, the estimated rate for an inter-frame prediction mode configuration may include expected number of bits used to indicate the inter-frame prediction technique, a motion vector (e.g., motion vector difference), and/or a transform unit split. Additionally, the estimated rate of the skip mode may include number of bits expected to be used to indicate the coding unit when prediction encoding is skipped.

In embodiments where the rate-distortion cost of equation (1) is used, the mode decision block 58 may select a luma prediction mode configuration or skip mode with the lowest associated rate-distortion cost for the coding unit. In this manner, the mode decision block 58 may determine encoding parameters, such as prediction technique for the coding unit, number of prediction units in the coding unit, size of the prediction units, location of the prediction units, luma prediction mode for each of the prediction units, luma prediction residuals for each of the prediction units, number of transform units in each of the prediction units, size of the transform units, location of the transform units, whether to split the coding unit into smaller coding units, or any combination thereof.

To improve quality of decoded image data, the main pipeline 48 may then mirror decoding of encoded image data. To facilitate, the mode decision block 58 may output the encoding parameters to the chroma reconstruction block 60 and the luma reconstruction block 62. Based at least in part on encoding parameters, the luma reconstruction block 62 may determine a reconstructed luma sample of the coding unit and the chroma reconstruction block 60 may determine a reconstructed chroma sample of the coding unit.

To facilitate, the luma reconstruction block 62 may determine luma encoding parameters used to generate the reconstructed luma sample. In some embodiments, the luma encoding parameters may include number of luma prediction blocks in the coding unit, location of the luma prediction blocks, size of the luma prediction blocks, luma prediction modes, luma prediction residuals, number of luma transform blocks in each luma prediction block, size of the luma transform blocks, location of the luma transform blocks, or any combination thereof. In such embodiments, the luma reconstruction block 62 may receive the luma prediction modes and the luma prediction residuals from the mode decision block 58. Additionally, the luma reconstruction block 62 may set number, size, and/or location of the luma prediction blocks equal to number, size, and/or location of the prediction units. Furthermore, the luma reconstruction block 62 may set number, size, and/or location of the luma transform blocks equal to number, size, and/or location of the transform units.

To determine the reconstructed luma sample of a luma transform block, the luma reconstruction block 62 may apply a luma prediction mode of a luma prediction block that includes the luma transform block to determine a luma prediction sample. The luma reconstruction block 62 may then subtract the luma prediction sample from source image data corresponding with the luma transform block to determine a luma prediction residual.

Additionally, the luma reconstruction block 62 may perform a forward transform and/or forward quantization (FTQ) on the luma prediction residual to determine an encoded luma prediction residual and perform an inverse transform and/or inverse quantization (ITQ) on the encoded luma prediction residual to determine a reconstructed luma prediction residual, which indicates a decoded luma prediction residual expected to be determined by a decoding device. In some embodiments, the luma reconstruction block 62 may perform the forward transform and/or the inverse transform using transform coefficients. Additionally, in some embodiments, the luma reconstruction block 62 may perform quantization of the transform coefficients producing quantized transform coefficients and/or inverse quantization of the quantized transform coefficients. Quantization is controlled by a quantization parameter, which is associated with a quantizer step size.

The luma reconstruction block 62 may then add the reconstructed luma prediction residual to the luma prediction sample to determine the reconstructed luma sample of the transform block, which indicates a decoded luma image data expected to be determined by the decoding device. In this manner, the luma reconstruction block 62 may determine a reconstructed luma sample of each luma transform block in the coding unit and, thus, a reconstructed luma sample of the coding unit, which may be output to the back-end-filter block 64.

On the other hand, the chroma reconstruction block 60 may determine chroma encoding parameters used to generate the reconstructed chroma (e.g., Cr and Cb) samples. In some embodiments, the chroma encoding parameters may include number of chroma prediction blocks in the coding unit, location of the chroma prediction blocks, size of the chroma prediction blocks, chroma prediction modes, chroma prediction residuals, number of chroma transform blocks in each chroma prediction block, size of the chroma transform blocks, location of the chroma transform blocks, or any combination thereof.

Additionally, in some embodiments, the chroma reconstruction block 60 may determine number, size and/or location of the chroma transform blocks based at least in part on chroma sampling format. For example, when using a 4:4:4 sampling format, the luma and chroma components are sampled at the same resolution. As such, the chroma reconstruction block 60 may set number, size and/or location of the chroma transform blocks per component equal to number, size and/or location of the transform units. However, when the luma and chroma are sampled at different resolutions (e.g., 4:2:2 or 4:2:0), the chroma reconstruction block 60 may set the number, size and/or location of the chroma prediction blocks per component equal to a scaled version of the number, size and/or location of the prediction units. For example, when the 4:2:2 sampling format is used, the chroma reconstruction block 60 may scale the size of the prediction units in half horizontally to determine the size of the chroma prediction blocks. Additionally, when the 4:2:0 sampling format is used, the chroma reconstruction block 60 may scale the size of the prediction units in half vertically and horizontally to determine size of the chroma prediction blocks.

Furthermore, the chroma reconstruction block 60 may determine the chroma prediction modes and, thus, the chroma prediction residuals based at least in part on the prediction technique of the coding unit and/or the luma prediction modes. For example, when an inter-frame prediction technique is selected, the chroma reconstruction block 60 may set the chroma inter-frame prediction mode used to encode a chroma prediction block equal to the luma inter-frame prediction mode used to encode a co-located luma prediction block. In other words, when an inter-frame prediction technique is selected for the coding unit, evaluation of multiple candidate chroma inter-frame prediction modes may be obviated, thereby facilitating reduction computational complexity of the main pipeline 48.

However, when an intra-frame prediction technique is selected, the chroma reconstruction block 60 may evaluate multiple candidate chroma intra-frame prediction modes to facilitate reducing distortion in decoded image data. In some embodiments, the chroma reconstruction block 60 may select a chroma intra-frame prediction mode used to encode a chroma prediction block based at least in part on expected resulting distortion.

To determine the reconstructed chroma sample of a chroma transform block, the chroma reconstruction block 60 may apply a chroma prediction mode of a chroma prediction block that includes the chroma transform block to determine a chroma prediction sample. The chroma reconstruction block 60 may then subtract the chroma prediction sample from source image data corresponding with the chroma transform block to determine a chroma prediction residual.

Additionally, the chroma reconstruction block 60 may perform a forward transform and/or forward quantization (FTQ) on the chroma prediction residual to determine an encoded chroma prediction residual and perform an inverse transform and/or inverse quantization (ITQ) on the encoded chroma prediction residual to determine a reconstructed chroma prediction residual, which indicates a decoded chroma prediction residual expected to be determined by a decoding device. In some embodiments, the chroma reconstruction block 60 may perform the forward transform and/or the inverse transform using transform coefficients. Additionally, in some embodiments, the chroma reconstruction block 60 may perform the quantization of the transform coefficients producing quantized transform coefficients and/or inverse quantization of the quantized transform coefficients. Quantization is controlled by a quantization parameter, which is associated with a quantizer step size.

In some embodiments, the chroma reconstruction block 60 may skip performing the transforms (e.g., forward transform and inverse transform) on the chroma prediction residual. For example, as will be described in more detail below, the chroma reconstruction block 60 may skip the transforms when the chroma reconstruction block 60 determines that corresponding source image data likely includes synthetic content and/or large content discontinuities. In some embodiments, the chroma reconstruction block 60 may determine likelihood of synthetic content based at least in part on gradient of the corresponding luma component. Additionally, in some embodiments, the chroma reconstruction block 60 may skip the transforms based on number of luma transform blocks in the prediction unit that skip the transforms, number of neighboring luma transform blocks that skip the transforms, and/or number of neighboring chroma transform blocks that skip the transforms.

The chroma reconstruction block 60 may then add the reconstructed chroma prediction residual to the chroma prediction sample to determine the reconstructed chroma sample of the chroma transform block, which indicates decoded chroma image data expected to be determined by the decoding device. In this manner, the chroma reconstruction block 60 may determine a reconstructed chroma sample of each chroma transform block in the coding unit and, thus, a reconstructed chroma sample of the coding unit, which may be output to the to the back-end-filter block 64. Additionally, in some embodiments, reconstructed chroma samples may be stored, for example, to enable the chroma reconstruction block 60 to determine reconstructed samples of subsequently processed coding units.

To improve the quality (e.g., likelihood of perceivable visual artifacts) of image frames displayed based on decoded image data, the back-end-filtering block 64 may determine filtering parameters used to filter the decoded image data. In some embodiments, the filtering parameters may include deblock filtering parameters and/or sample adaptive offset (SAO) parameters. For example, based on the deblock filtering parameters, a decoding device may perform a deblocking operation on the decoded image data to reduce likelihood of perceivable blocking artifacts caused by encoding the source image data in rectangular units (e.g., coding tree units, coding units, prediction units, and/or transform units). Additionally, based on the sample adaptive offset filtering parameters, the decoding device may perform a sample adaptive offset operation on the decoded image data to reduce likelihood of perceivable color and/or brightness artifacts, for example, resulting from prediction encoding.

Accordingly, as will be described in more detail below, to facilitate determining the filtering parameters, the back-end-filter block 64 may analyze the reconstructed image data, which indicates decoded image data expected to be determined by a decoding device. Thus, in the depicted embodiment, the back-end-filtering block 64 may receive reconstructed chroma image data from the chroma reconstruction block 60 and reconstructed luma image data from the luma reconstruction block 62. The filtering parameters determined by the back-end-filtering block 64 may then be communicated to the decoding device.

In addition to the filtering parameters, other encoding parameters used to generate encoded image data may be communicated to a decoding device. In some embodiments, the encoding parameters may include the encoding parameters determined by the mode decision block 58 (e.g., prediction unit configuration and/or transform unit configuration), luma encoding parameters determined by the luma reconstruction block 62, chroma encoding parameters determined by the chroma reconstruction block 60, and/or filtering parameters determined by the back-end-filtering block 64. To facilitate communication, the encoding parameters may be expressed as syntax elements. For example, a first syntax element may indicate a prediction mode (e.g., inter-frame prediction mode or intra-frame prediction mode), a second syntax element may indicate a quantization coefficient, a third syntax element may indicate configuration of prediction units, and a fourth syntax element may indicate configuration of transform units.

In some embodiments, resources used to store and/or communicate the encoding parameters may be reduced using entropy encoding, such as context adaptive binary arithmetic coding (CABAC) and/or context-adaptive variable-length coding (CAVLC). To facilitate, the syntax element binarization block 66 may receive encoding parameters expressed as syntax elements from the mode decision block 58, the luma reconstruction block 62, the chroma reconstruction block 60, and/or the back-end-filter block 64. The syntax element binarization block 66 may then binarize a syntax element by mapping the syntax element to a corresponding binary symbol, which includes one or more bins (e.g., "0" or "1"). In some embodiments, the syntax element binarization block 66 may generate the binary symbol using exp-golomb, fixed length, truncated unary, truncated rice, or any combination thereof. In this manner, the syntax element binarization block 66 may generate a bin stream, which is supplied to the transcode pipeline 50.

The transcode pipeline 50 may then convert the bin stream to a bit stream with one or more syntax elements represented by a fractional number of bits. In some embodiments, the transcode pipeline 50 may compress bins from the bin stream into bits using arithmetic coding. To facilitate arithmetic coding, the transcode pipeline 50 may determine a context model for a bin, which indicates probability of the bin being a "1" or "0," based on previous bins. Based on the probability of the bin, the transcode pipeline 50 may divide a range into two sub-ranges. The transcode pipeline 50 may then determine an encoded bit such that it falls within one of two sub-ranges to select the actual value of the bin. In this manner, multiple bins may be represented by a single bit, thereby improving encoding efficiency (e.g., reduction in size of source image data). After entropy encoding, the transcode pipeline 50, may transmit the encoded image data to the output 38 for transmission, storage, and/or display.

As described above, computation complexity may affect operating duration and/or circuitry size of the video encoding pipeline 34. In some embodiments, the duration provided for encoding image data may be limited, particularly to enable real-time or near real-time display and/or transmission. Thus, to enable real-time or near real-time display and/or transmission, computational complexity of the video encoding pipeline 34 may be reduced to facilitate reducing operating duration of the back-end-filtering block 64. Additionally, size of circuitry used to implement the video encoding pipeline 34 may be limited, particularly when included in a mobile device. Thus, to facilitate reducing circuitry size, computational complexity of the video encoding pipeline 34 may be reduced.

In some embodiments, operating duration of the back-end-filtering block 64 may be reduced by determining deblock filtering parameters and sample adaptive offset parameters at least partially in parallel. Additionally, in some embodiments, quality (e.g., number of bits and/or resulting perceivable visual artifacts) of filtering parameters may be improved by enabling size, shape, and/or location of an offset sample used to determine the sample adaptive offset parameters to be dynamically adjusted and/or enabling selection criteria (e.g., rate-distortion cost and/or range around central offset candidate) used to determine sample adaptive offset parameters to be dynamically adjusted.

Figure 7:
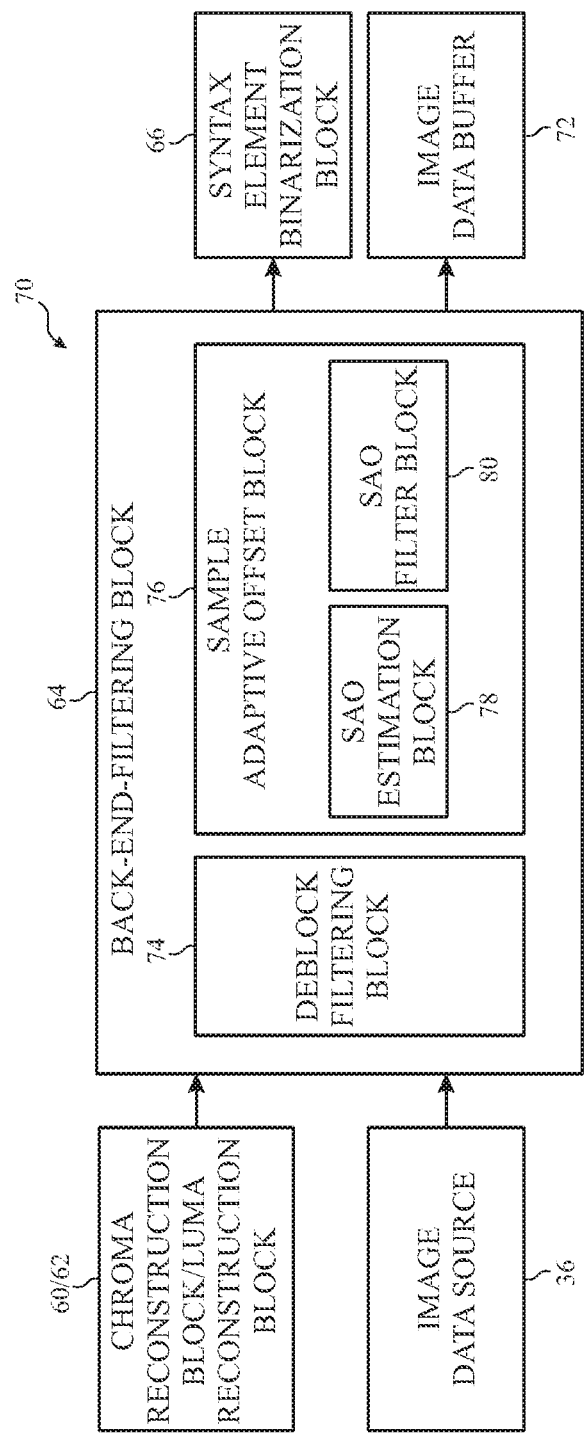
FIG. 7 is block diagram of a portion of the video encoding pipeline of FIG. 6 including a deblock filtering block and a sample adaptive offset block, in accordance with an embodiment.

To help illustrate, the image data source 36 and a portion 70 of the video encoding pipeline 34, which includes the chroma reconstruction block/luma reconstruction block 60/62, the syntax element binarization block 66, and an image data buffer 72 are described in FIG. 7. As depicted, the back-end-filtering block 64 includes a deblock filtering block 74 and a sample adaptive offset (SAO) block 76, which includes a sample adaptive offset estimation block 78 and a sample adaptive offset filtering block 80.

As described above, the back-end-filtering block 64 may determine filtering parameters, such as deblock filtering parameters and/or sample adaptive offset parameters. In the depicted embodiment, the deblock filtering block 74 may determine the deblock filtering parameters and apply the deblock filtering parameters to reconstructed image data to generate deblocked image data. Accordingly, in such embodiments, the deblock filtering block 74 may receive reconstructed image data from the chroma reconstruction block 60 and the luma reconstruction block 62.

Figure 8:
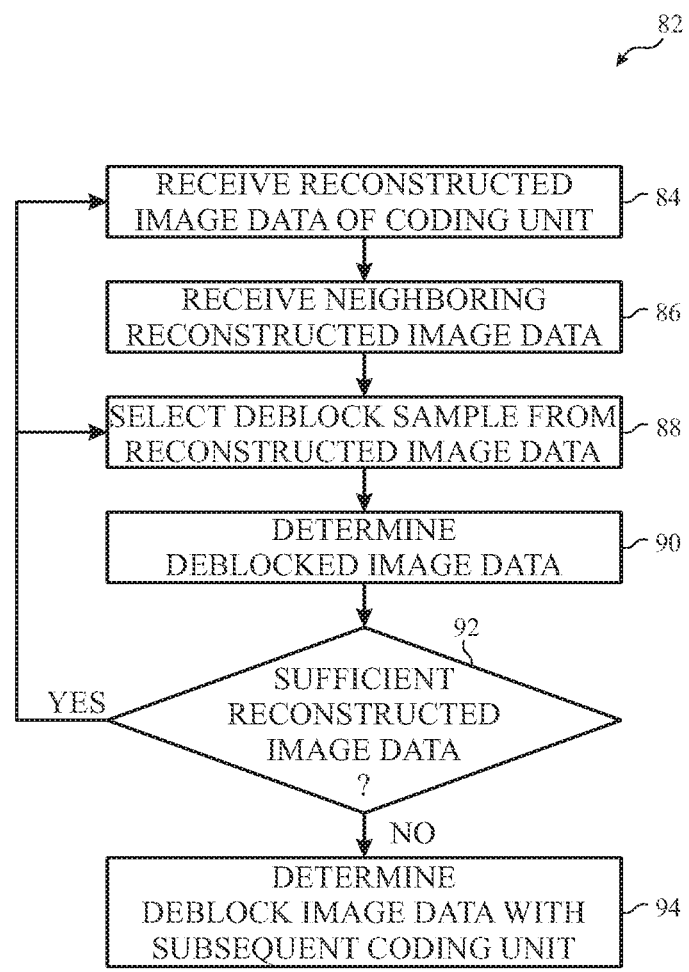
FIG. 8 is a flow diagram of a process for operating the deblock filtering block of FIG. 7, in accordance with an embodiment.

To help illustrate, one embodiment of a process 82 describing operation of the deblock filtering block 74 is presented in FIG. 8. Generally, the process 82 includes receiving reconstructed image data of a coding unit (process block 84), receiving neighboring reconstructed image data (process block 86), selecting a deblock sample from the reconstructed image data (process block 88), determining deblocked image data (process block 90), and determining whether sufficient reconstructed image data remains to form another deblock sample (decision block 92). Additionally, process 82 includes determining another deblock sample when sufficient reconstructed image data remains (process block 92) and determining deblocked image data for the coding unit with a subsequent coding unit when sufficient reconstructed image data does not remain (process block 94). In some embodiments, the process 82 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the deblock filtering block 74 to determine reconstructed image data corresponding with a coding unit (e.g., a coding tree unit) (process block 84). As described above, the deblock filtering block 74 may determine deblock filtering parameters to reduce likelihood of perceivable blocking artifacts that may result due to encoding the source image data in rectangular units. Thus, the controller 40 may use the deblock filtering block to determine reconstructed image data neighboring the coding unit (process block 86).

Figure 9:
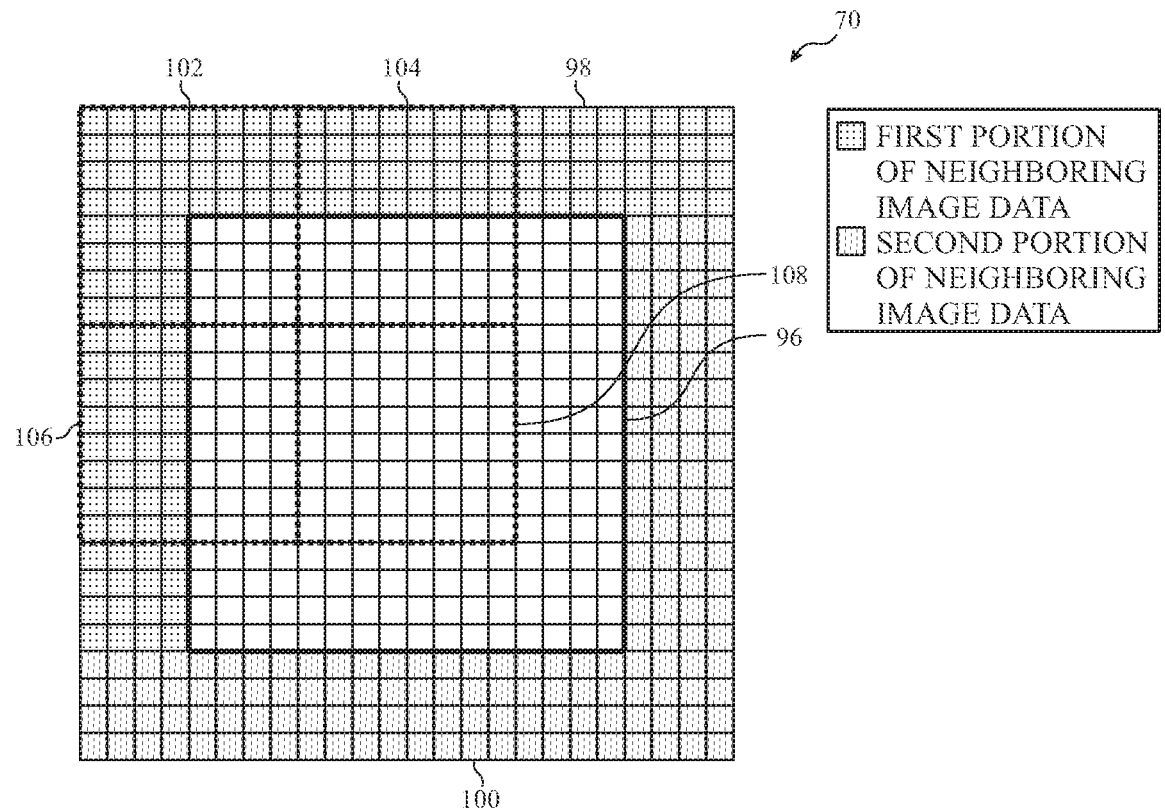
FIG. 9 is a diagrammatic of a 16×16 coding unit and neighboring image data processed by the deblock filtering block of FIG. 7, in accordance with an embodiment.

To help illustrate, a diagrammatic representation of a 16×16 coding unit 96 and neighboring image data is described in FIG. 9. In the depicted embodiment, the neighboring image data includes a first portion 98, which may be part of a left neighboring coding unit, a top left neighboring coding unit, a top neighboring coding unit, and a top right neighboring coding unit. Additionally, the neighboring image data includes a second portion 100, which may be part of a bottom left neighboring coding unit, a bottom neighboring coding unit, a bottom right neighboring coding unit, and a right neighboring coding unit.

With regard to the depicted embodiment, the video encoding pipeline 34 may process coding units in raster scan order. As such, the video encoding pipeline 34 may process the left neighboring coding unit, the top left neighboring coding unit, the top neighboring coding unit, and the top right neighboring coding unit before the 16×16 coding unit 96. Additionally, the video encoding pipeline 34 may process the bottom left neighboring coding unit, the bottom neighboring coding unit, the bottom right neighboring coding unit, and the right neighboring coding unit after the 16×16 coding unit 96.

Thus, while processing the 16×16 coding unit 96, reconstructed image data corresponding with the 16×16 coding unit 96 and the first portion 98 of the neighboring image data may be available since previously determined. In some embodiments, the deblock filtering block 74 may receive the luma (e.g., Y) component of the reconstructed image data from the luma reconstruction block 62 and the chroma (e.g., Cr and Cb) components of the reconstructed image data from the chroma reconstruction block 60. Additionally or alternatively, in some embodiments, the deblock filtering block 74 may receive the reconstructed image data from the image data buffer 72.

Returning to the process 82 described in FIG. 8, the controller 40 may use the deblock filtering block 74 to select a deblock sample from the reconstructed image data (process block 88) and determine corresponding deblocked image data (process block 90). As described above, deblocked image data may be generated by applying deblock filtering parameters, such as a boundary strength parameter, to reconstructed image data in the deblock sample. Additionally, as described above, the deblock filtering parameters may be used to reduce likelihood of perceivable blocking artifacts that may result from encoding the source image data in rectangular units. Thus, the deblock filtering block 74 may select the sample such that it includes a boundary of the coding unit.

For example, as depicted in FIG. 9, the deblock filtering block 74 may select a first 8×8 deblock sample 102 from reconstructed image data corresponding with the 16×16 coding unit and the first portion 98 of neighboring image data. As depicted, the first 8×8 deblock sample 102 includes a portion of the top boundary and a portion of the left boundary of the 16×16 coding unit 96. Thus, by applying deblock filtering parameters to the first 8×8 deblock sample 102, the deblock filtering block 74 may determine deblocked image data, which may reduce perceivability alone the top boundary and/or the left boundary of the 16×16 coding unit 96.

Returning to the process 82 described in FIG. 8, the controller 40 may then use the deblock filtering block 74 to determine whether sufficient reconstructed image data remains to select another deblock sample (decision block 92). If so, controller 40 may use the deblock filtering block 74 to select another deblock sample from the reconstructed image data (process block 88) and determine corresponding deblocked image data (process block 90). In this manner, the deblock filtering block 74 may determine deblocked image data corresponding with a first portion (e.g., included in the first 8×8 deblock sample 102, the second 8×8 deblock sample 104, the third 8×8 deblock sample 106, or the fourth 8×8 deblock sample 108) of the coding unit.

For example, as depicted in FIG. 9, the deblock filtering block 74 may determine a second 8×8 deblock sample 104 from the reconstructed image data that includes a portion of the top boundary and determine corresponding deblocked image data. Additionally, the deblock filtering block 74 may determine a third 8×8 deblock sample 106 from the reconstructed image data that includes a portion of the left boundary and determine corresponding deblocked image data. In this manner, the deblock filtering block 74 may determine deblocked image data that reduces perceivability of blocking that may occur along the top and/or left boundary of the 16×16 coding unit 96.

As described above, a coding unit may be further divided into smaller rectangular units (e.g., prediction units and/or transform units) to encode the source image data. In such instances, blocking may also occur within the 16×16 coding unit 100, for example, along boundaries of the smaller rectangular units. Thus, in the depicted embodiment, the deblock filtering block 74 may also select a fourth 8×8 deblock sample 108 from the reconstructed image data, which does not include a boundary of the 16×16 coding unit 100, and determine corresponding deblocked image data. In this manner, the deblock filtering block 74 may determine deblocked image data that reduced perceivability of blocking that may occur within the coding unit 100.

Returning to the process 82 described in FIG. 8, the controller 40 may use the deblock filtering block 74 to determine deblocked image data corresponding with a portion of the coding unit with a subsequent coding unit when remaining reconstructed image data is insufficient to select another deblock sample (process block 94). For example, as depicted in FIG. 9, the deblock filtering block 74 may determine that reconstructed image data remaining after the first 8×8 deblock sample 102, the second 8×8 deblock sample 104, the third 8×8 deblock sample 106, and the fourth 8×8 deblock sample 108 are selected is insufficient to select another 8×8 deblock sample. As such, the deblock filtering block 74 may determine deblocked image data corresponding with a second portion (e.g., not part of first 8×8 deblock sample 102, the second 8×8 deblock sample 104, the third 8×8 deblock sample 106, or the fourth 8×8 deblock sample 108) of the 16×16 coding unit 96 while processing subsequent coding units. In other words, there may be some delay between when deblocked image data is determined for the first portion and the second portion of the coding unit.

Returning to FIG. 7, the sample adaptive offset block 76 may determine the sample adaptive offset parameters and apply the sample adaptive offset parameters to the deblocked image data to generate offset image data, which indicates image data expected to be used by a decoding device to display an image frame. In the depicted embodiment, the sample adaptive offset estimation block 78 may determine offset statistics used to determine the sample adaptive offset parameters and the sample adaptive offset filtering block 80 may apply the sample adaptive offset parameters to deblocked image data. Accordingly, the sample adaptive offset block 76 may receive deblocked image data from the deblock filtering block 74. Additionally, the sample adaptive offset block 76 may store the offset image data in the image buffer 72, for example, to facilitate processing subsequent image frames by the video encoding pipeline 34.

In addition to the deblocked image data, the sample adaptive offset estimation block 78 may determine the offset statistics based at least in part on source image data. Thus, in some embodiments, the sample adaptive offset estimation block 78 may receive source image data from the image data source 36. Additionally or alternatively, the sample adaptive offset estimation block 78 may receive source image data from the chroma reconstruction block 60, the luma reconstruction block 62, and/or the mode decision block 58.

As described above, some delay may occur between determination of deblocked image data corresponding with a first portion of a coding unit and a second portion of the coding unit. Thus, in some embodiments, the sample adaptive offset estimation block 78 may determine the offset statistics using reconstructed image data corresponding with the second portion of the coding unit instead of deblocked image data to facilitate reducing operating duration (e.g., computational complexity). Accordingly, in such embodiments, the sample adaptive offset estimation block 78 may receive reconstructed image data from the deblock filtering block 74, the chroma reconstruction block 60, and/the luma reconstruction block 62.

Figure 10:
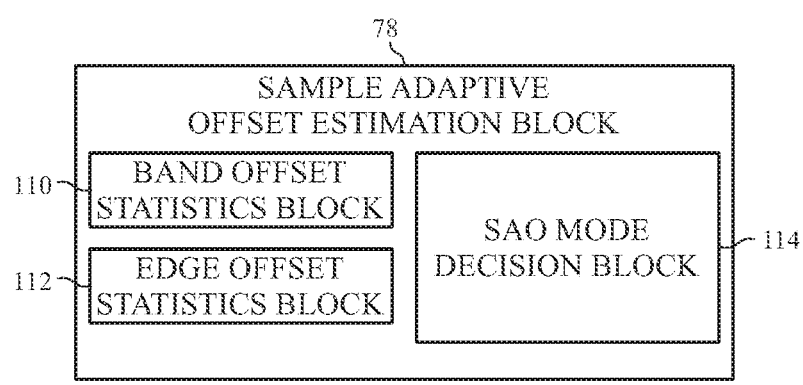
FIG. 10 is a block diagram of a portion of the sample adaptive offset block of FIG. 7 including a sample adaptive offset estimation block with a band offset statistics block, an edge offset statistics block, and a sample adaptive offset mode decision block, in accordance with an embodiment.

In some embodiments, the sample adaptive offset estimation block 78 may determine band offset statistics and/or edge offset statistics and determine sample adaptive offset parameters based at least in part on the band offset statistics and/or the edge offset statistics. To help illustrate, one embodiment of the sample adaptive offset estimation block 78 is described in FIG. 10. As depicted, the sample adaptive offset estimation block 78 includes a band offset statistics block 110, an edge offset statistics block 112, and a sample adaptive offset (SAO) mode decision block 114. In the depicted embodiment, the band offset statistics block 110 may determine band offset statistics used to determine band offset parameters, the edge offset statistics block 112 may determine the edge offset statistics used to determine edge offset parameters, and the sample adaptive offset mode decision block 114 may select sample adaptive parameters from multiple candidates, which may include explicit sample adaptive offset parameters (e.g., the band offset parameters, the edge offset parameters, and/or offset off parameters) and/or merge offset parameters (e.g., sample adaptive offset parameters selected for a neighboring coding unit).

Figure 11:
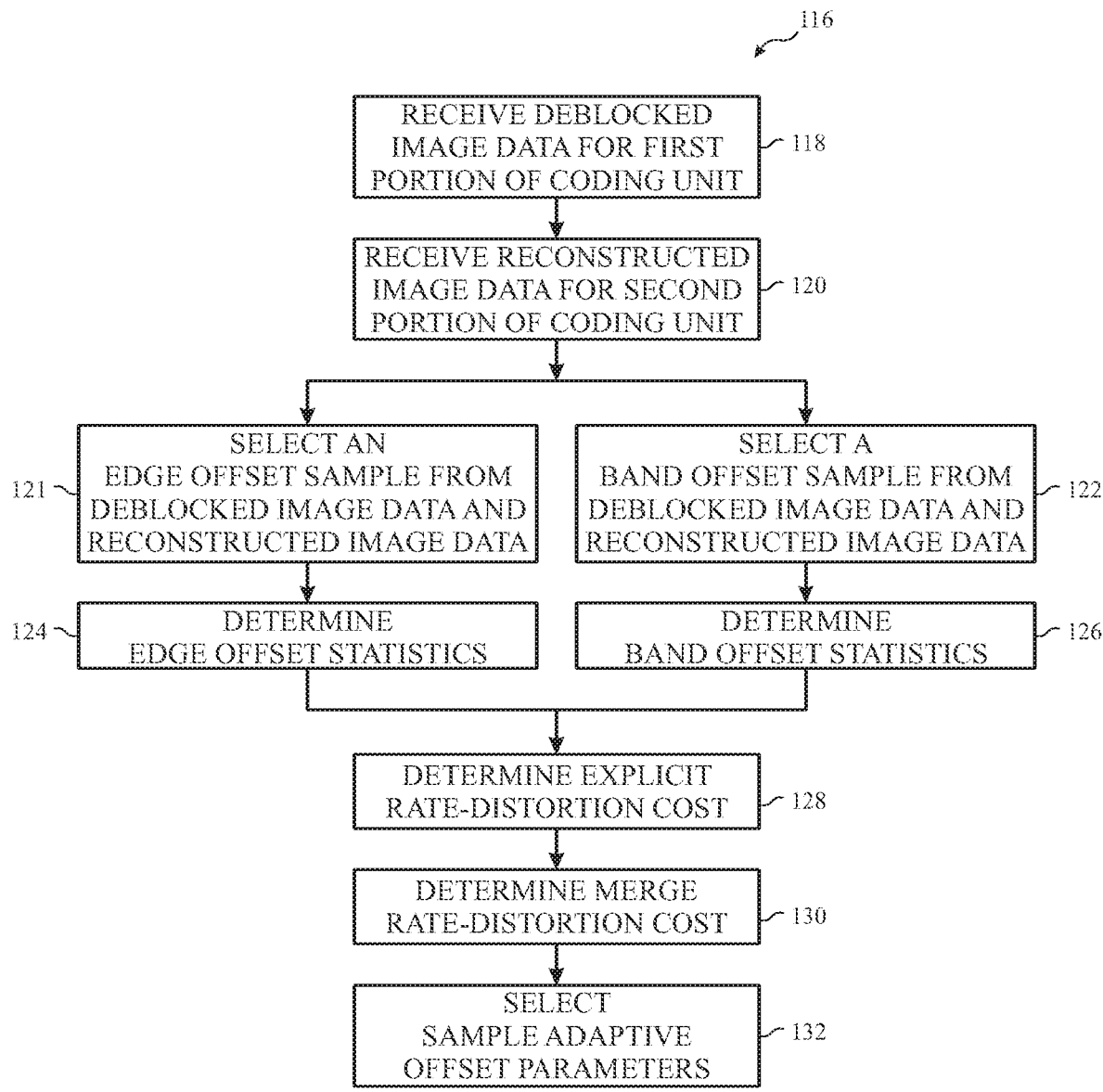
FIG. 11 is a flow diagram of a process for operating the sample adaptive offset estimation block of FIG. 10, in accordance with an embodiment.

To help illustrate, one embodiment of a process 116 describing operation of the sample adaptive offset estimation block 78 is presented in FIG. 11. Generally, the process 116 includes receiving deblocked image data corresponding with a first portion of a coding unit (process block 118), receiving reconstructed image data corresponding with a second portion of the coding unit (process block 120), selecting an edge offset sample from the deblocked image data and the reconstructed image data (process block 121), selecting a band offset sample from the deblocked image data and the reconstructed image data (process block 122), determining edge offset statistics (process block 124), determining band offset statistics (process block 126), determining and explicit rate-distortion cost associated with explicit sample adaptive offset parameters (process block 128), determining a merge rate-distortion cost associated with merge sample adaptive offset parameters (process block 130), and selecting sample adaptive offset parameters from the explicit sample adaptive offset parameters and the merge sample adaptive offset parameters (process block 132). In some embodiments, the process 116 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the sample adaptive offset estimation block 78 to receive deblocked image data for a first portion of a coding unit (process block 118). As described above, the deblock filtering block 74 may determine deblocked image data corresponding with the first portion of the coding unit. Thus, the sample adaptive offset estimation block 78 may receive the deblock image data corresponding with the first portion of the coding unit from the deblock filtering block 74.

Additionally, the controller 40 may use the sample adaptive offset estimation block 78 to receive reconstructed image data for a second portion of the coding unit (process block 120). As described above, the chroma reconstruction block 60 may determine the chroma components and the luma reconstruction block 62 may determine the luma component of reconstructed image data corresponding with the coding unit. Thus, the sample adaptive offset estimation block may receive the reconstructed image data corresponding with the second portion of the coding unit from the chroma reconstruction block 60 and the luma reconstruction block 62. Additionally or alternatively, the reconstructed image data may be passed from the deblock filtering block 74 to the sample adaptive offset estimation block 78.

From the deblocked image data and the reconstructed image data, the controller 40 may use the sample adaptive offset estimation block 78 to select an edge offset sample (process block 121) and to select a band offset sample (process block 122). As will be described in more detail below, edge offset statistics may be determined by analyzing image data included in the edge offset sample and band offset statistics may be determined by analyzing image data included in the band offset sample.

In some embodiments, the sample adaptive offset estimation block 78 may dynamically adjust the size, shape, and/or location of an offset sample (e.g., a band offset sample or edge offset sample) to reduce computational complexity of determining the edge offset statistics and/or the band offset statistics. For example, the sample adaptive offset estimation block 78 may adjust size of the offset sample to include a subset of the reconstructed image data and/or the deblocked image data. As such, amount of image data analyzed may be reduced, thereby facilitating reduced computational complexity (e.g., operating duration and/or circuitry size) of determining the offset statistics.

Additionally, in some embodiments, the sample adaptive offset estimation block 78 may dynamically adjust the size, shape, and/or location of an offset sample (e.g., a band offset sample or edge offset sample) to improve quality/reliability (e.g., ability to reduce likelihood of perceivable artifacts) of sample adaptive parameters determined based at least in part on the edge offset statistics and/or the band offset statistics. For example, the sample adaptive offset estimation block 78 may select an offset sample to include an important portion of the coding unit, which is expected to be representative of a majority of the coding unit. Thus, sample adaptive parameters determined based the offset sample, which includes the important portion of the coding unit, may be more useful for reducing likelihood of perceivable visual artifacts in the majority of the coding unit.

Additionally or alternatively, the sample adaptive offset estimation block 78 may select an offset sample to exclude a noisy portion of the coding unit, which is expected to vary greatly from the majority of the coding unit. Since the noisy portion varies from the majority of the coding unit, sample adaptive offset parameters determined based on the noisy portion may be less useful for reducing likelihood of perceivable visual artifacts in the majority coding unit. Thus, sample adaptive parameters determined based on the offset sample, which excludes the noisy portion of the coding unit, may be more useful for reducing likelihood of perceivable visual artifacts in the majority of the coding unit.

As such, in such embodiments, the sample adaptive offset estimation block 78 may determine location of the important portion and/or location of the noisy portion in the coding unit and select the offset sample accordingly. In some embodiments, the sample adaptive offset estimation block 78 may identify the important portion and/or the noisy portion based at least in part on local statistics of the source image data, such as local average luminance amplitudes, local average chroma amplitudes, variance, edge information, texture information, and/or gradient information. For example, the sample adaptive offset estimation block 78 may determine that the important portion corresponds to source image data with a variance that is similar to variance of the majority of the source image data in the coding unit.

Additionally, the sample adaptive offset estimation block 78 may determine that the noisy portion corresponds to source image data with a variance that differs greatly from variance of the majority of the source image data in the coding unit. For example, when the source image data corresponding with a coding unit includes an image of a tree overlaid with closed captioning text, variance of the source image corresponding with a first portion of the tree should be similar to variance of the source image data corresponding with a second portion of the tree. On the other hand, variance of the source image data corresponding with the closed captioning text may differ greatly from the variance of the source image data corresponding with the first portion of the tree and the variance of the source image data corresponding with the second portion of the tree. As such, the sample adaptive offset estimation block 78 may determine that the important portion of the coding unit includes the first portion of the tree and/or the second portion of the tree. Additionally, the sample adaptive offset block 78 may determine that the noisy portion of the coding unit includes the closed captioning text.

Furthermore, in some embodiments, location of the important portion and/or location of the noisy portion in the coding unit may be determined based at least in part on edge information, texture information, and/or gradient information. In such embodiments, edge information, texture information, and/or gradient information may be determined based on gradient histograms, which model distribution of intensity gradients and/or edge directions.

Additionally or alternatively, the sample adaptive offset estimation block 78 may determine expected location of the noisy portion based at least in part on location of noisy portions in a co-located coding unit in a previous image frame. For example, close captioning text is generally included on the same portion of each image frame. Thus, when the sample adaptive offset estimation block 78 determines that closed captioning text is included in a portion of a coding unit, the sample adaptive offset estimation block 78 may determine that closed captioning text is likely to be at the same location in subsequent coding units.

To further improve quality of the offset statistics, the sample adaptive offset estimation block 78 may select the edge offset sample and/or the band offset sample based at least in part on where visual artifacts are expected to occur. For example, since ringing may result around edges, the sample adaptive offset estimation block 78 may select the edge offset sample around an edge in the coding unit. Additionally, since banding may result in an image of sky, the sample adaptive offset estimation block 78 may select the band offset sample to include the portion of the coding unit with the sky. Accordingly, the sample adaptive offset estimation block 78 may determine location where visual artifacts are expected to occur in the coding unit and select an offset sample (e.g., edge offset sample and/or band offset sample) accordingly.

However, location of visual artifacts addressed by applying edge offsets and visual artifacts addressed by band offsets may be not necessarily be co-located. Thus, to improve quality of the offset statistics, the edge offset sample and the band offset sample may be different. In other words, the edge offset sample and the band offset sample may vary in size, shape, and/or location.

Figure 12:
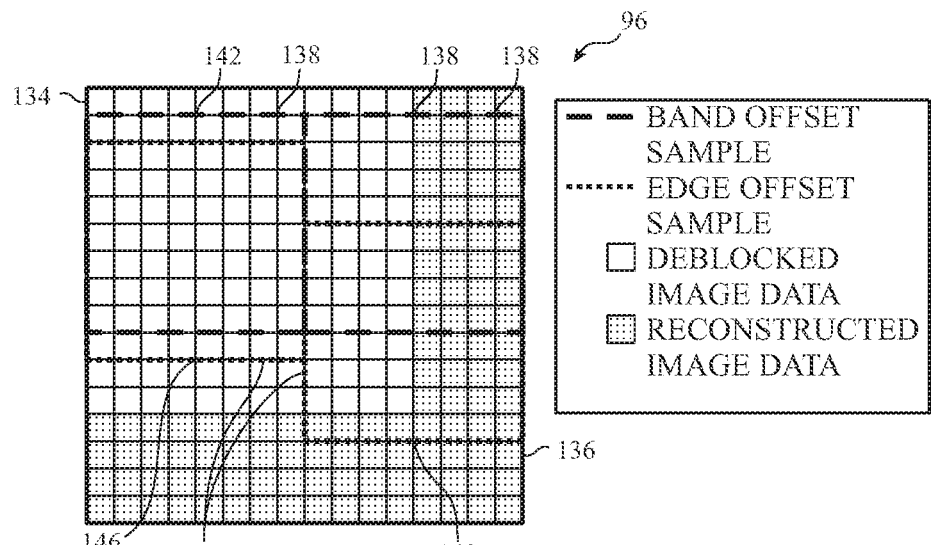
FIG. 12 is a diagrammatic representation of the 16×16 coding unit of FIG. 9 processed by the sample adaptive offset estimation block of FIG. 10, in accordance with an embodiment.

To help illustrate, a diagrammatic representation of the 16×16 coding unit 96 is again described in FIG. 12. As depicted, the 16×16 coding unit 96 includes a first portion 134 (solid white portion), which includes deblocked image data, and a second portion 136 (dotted portion), which includes reconstructed image data. Additionally, a band offset sample 138 (dashed lines) and an edge offset sample 140 (dotted lines) are selected in the 16×16 coding unit 96. As depicted, the band offset sample 138 and the edge offset sample 140 vary in shape and location. For example, this may enable the band offset sample 138 to select a portion of the 16×16 coding unit 96 corresponding with sky and the edge offset sample 140 to select a portion of the 16×16 coding unit 96 around an edge.

Since the size, shape, and/or location may be dynamically adjusted, in some embodiments, an offset sample (e.g., band offset sample or edge offset sample) may be indicated using one or more smaller (e.g., 8×8) samples. For example, in the depicted embodiment, the band offset sample 138 is selected using a first 8×8 sample 142 and a second 8×8 sample 144. Additionally, in the depicted embodiment, the edge offset sample 140 is selected using a third 8×8 sample 146 and a fourth 8×8 sample 148.

Returning to the process 116 described in FIG. 11, the controller 40 may use the band offset statistics block 110 to determine band offset statistics (process block 126). In some embodiments, the band offset statistics may include mapping between possible band classifications and corresponding band offsets, which may be applied to decoded image data that falls within the band classification. As described above, a band classification may include a range of magnitudes of a component (e.g., luma component or chroma component). For example, when the total magnitude range of a component is from 0-255, the total magnitude range may be divided into thirty-two band classifications with each band classification including eight magnitude values. To determine the mapping, the band offset statistics block 110 may analyze the band offset sample to determine band offset values to associate with each of the band classifications.

Figure 13:
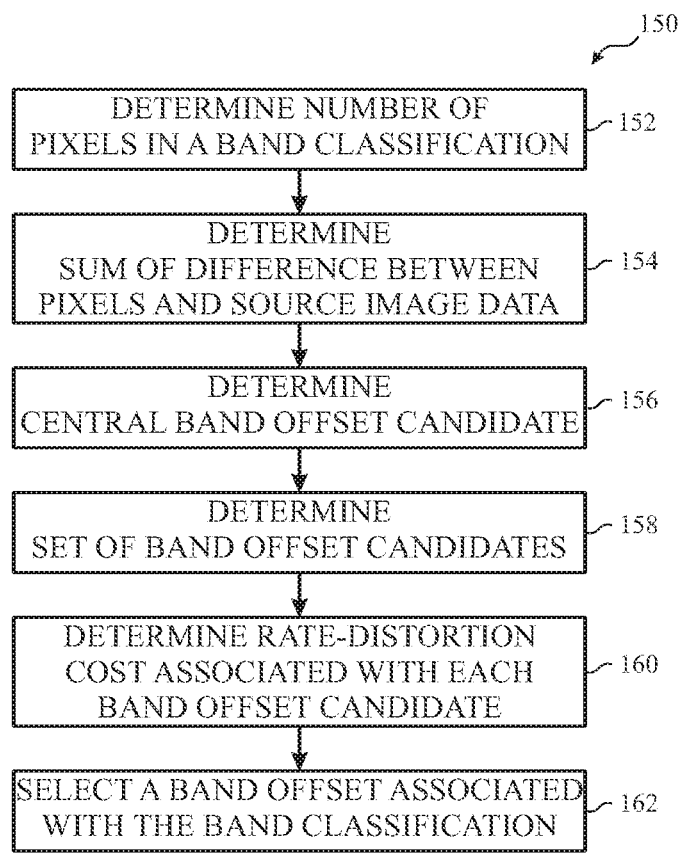
FIG. 13 is a flow diagram of a process for operating the band offset statistics block of FIG. 10, in accordance with an embodiment.

To help illustrate, one embodiment of a process 150 describing operation of the band offset statistics block 110 is presented in FIG. 13. Generally, the process 150 includes determining number of pixels that fall within a band classification (process block 152), determining sum of differences between the pixels and source image data (process block 154), determining a central band offset candidate (process block 156), determining a set of band offset candidates (process block 158), determining a rate-distortion cost associated with each band offset candidate (process block 160), and selecting a band offset to associate with the band classification (process block 162). In some embodiments, the process 150 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the band offset statistics block 110 to determine number of pixels in the band offset sample that fall within a band classification (process block 152). For example, the band offset statistics block 110 may progress through the image data corresponding with each pixel in the band offset sample and determine whether magnitude falls within the magnitude range of the band classification. In some embodiments, the band offset statistics block 110 may increment a counter each time a pixel falls within the band classification.

Additionally, the controller 40 may use the band offset statistics block 110 to determine a sum of differences between the pixels that fall within the band classification and corresponding (e.g., co-located) source image data (process block 154). In some embodiments, the band offset statistics block 110 may determine difference between image data in the band offset sample that falls within the band classification and co-located source image data. To determine the sum of differences, the band offset statistics block 110 may add together the difference determined for each pixel in the band offset sample that falls within the band classification.

Based on the number of pixels that fall within the band classification and the sum of differences, the controller 40 may use the band offset statistics block 110 to determine a central band offset candidate (process block 156). In some embodiments, the band offset statistics block 110 may determine the central band offset candidate by dividing the sum of differences by the number of pixels. However, performing division operations may be computationally complex, particularly when the video encoding pipeline 34 is implemented using circuitry (e.g., hardware). Thus, in some embodiments, the band offset statistics block 110 may instead determine the central band offset candidate using addition, subtraction, and shift operations, thereby reducing computational complexity (e.g., to circuitry size).

Figure 14:
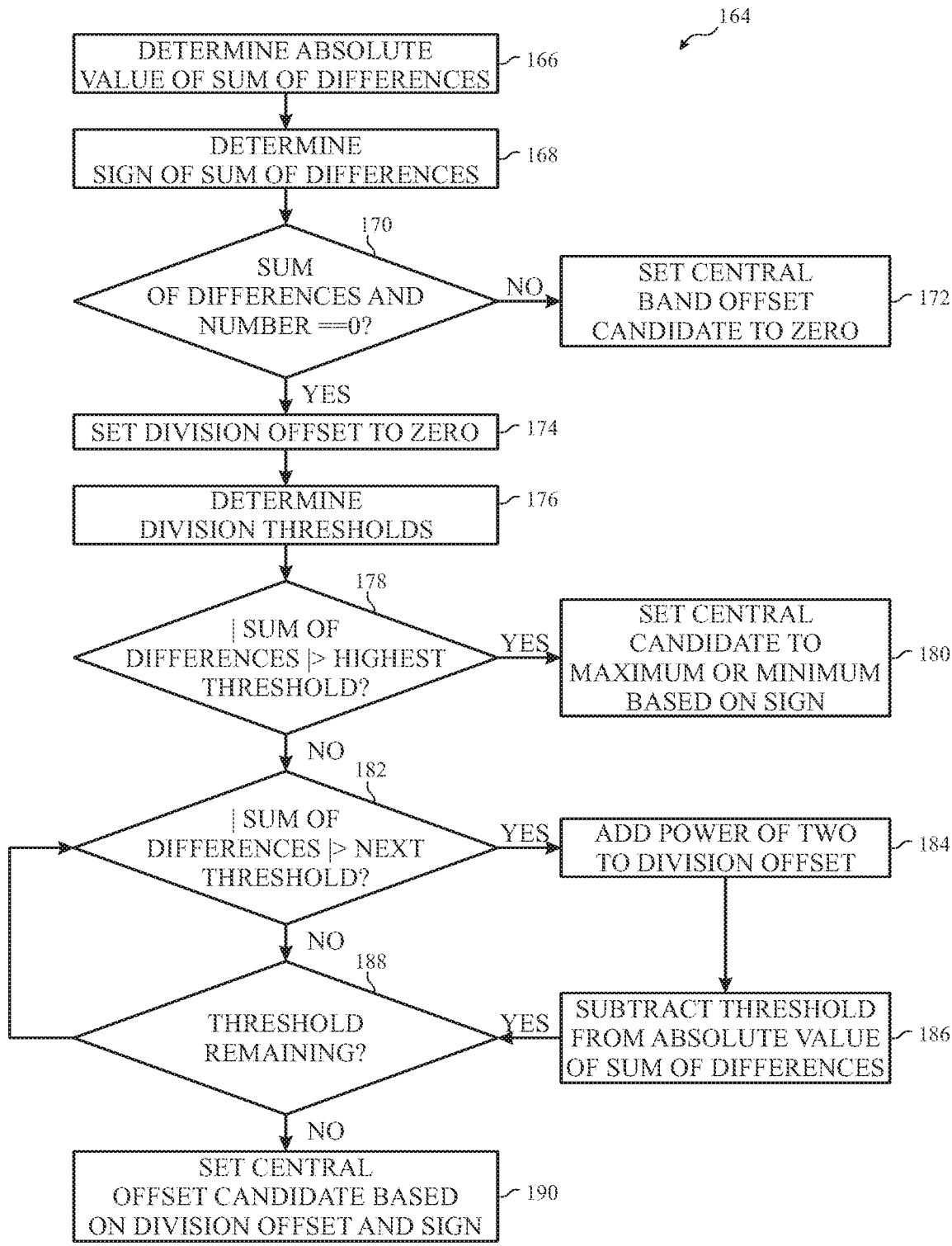
FIG. 14 is a flow diagram of a process for determining a central offset candidate for use in the band offset statistics block and/or the edge offset statistics block of FIG. 10, in accordance with an embodiment.

To help illustrate, one embodiment of a process 164 for determining a central offset candidate is described in FIG. 14. Generally, the process 164 includes determining an absolute value of a sum of differences (process block 166), determining sign of the sum of differences (process block 168), determining whether the sum of differences and number of pixels that fall with a band classification are both equal to zero (decision block 170), and setting the central band off candidate to zero when both are equal to zero (process block 172). When not both equal to zero, the process 164 includes setting a division offset to zero (process block 174), determining division thresholds (process block 176), determining whether the absolute value of the sum of differences is greater than a largest division threshold (decision block 178), setting the central offset candidate to a maximum or minimum based on the sign of the sum of difference when the absolute value of the sum of differences is greater than the largest division threshold (process block 180), and determining whether the absolute value of the sum of differences is greater than a next division threshold when not greater than the largest division threshold (decision block 182). When greater than the next threshold, the process 164 includes adding a power of two to the division offset (process block 184) and subtracting the division threshold from the absolute value of the sum of differences (process block 186). Additionally, the process 164 includes determining whether division thresholds remain (decision block 188) and setting the central offset candidate based on the division offset and sign of the sum of differences when no more division threshold remain (process block 190). In some embodiments, the process 164 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may determine the absolute value of the sum of differences (process block 166). Additionally, the controller 40 may determine the sign of the sum of differences (process block 166). In other words, the controller 40 may determine whether the sum of differences is positive or negative. Furthermore, the controller 40 determines whether the sum of differences and the number of pixels in the sample adaptive offset sample are both equal to zero (decision block 170). When both are equal to zero, the controller 40 may set the central offset candidate equal to zero (process block 172). On the other hand, when both are not equal to zero, the controller 40 may set a division offset initially to zero (process block 174).

Additionally, the controller 40 may determine division thresholds (process block 176). In some embodiments, the controller 40 may determine the division thresholds based at least in part on a remainder biasing factor. Since the offset candidates are integer values, non-integer (e.g., fractional or decimal) quotients of the sum of differences divided by the number of pixels may be rounded to an integer value. As such, the remainder biasing factor may be included in the division thresholds to bias toward rounding up or rounding down non-integer quotients. For example, in some embodiments, the remainder biasing factor may be number of pixels divided by two to bias toward rounding up non-integer quotients.

Furthermore, the controller 40 may determine the division threshold based at least in part on number of bits used to indicate the image data. For example, when the image data is 10-bits, the controller 40 may determine six division thresholds. In some embodiments, a first (e.g., lowest) division threshold may be equal to number of pixels that fall within a band classification minus the remainder biasing factor, a second division threshold may be equal to number of pixels left shifted by one bit minus the remainder biasing factor, a third division threshold may be equal to number of pixels left shifted by two bits minus the remainder biasing factor, a fourth division threshold may be equal to number of pixels left shifted by three bits minus the remainder biasing factor, a fifth division threshold may be equal to number of pixels left shifted by four bits minus the remainder biasing factor, and a sixth (e.g., highest) division threshold may be equal to number of pixel left shifted by five bits minus the remainder biasing factor.

Additionally, when the image data is 8-bits, the controller 40 may determine four division thresholds. In some embodiments, a first (e.g., lowest) division threshold may be equal to number of pixels minus the remainder biasing factor, a second division threshold may be equal to number of pixels left shifted by one bit minus the remainder biasing factor, a third division threshold may be equal to number of pixels left shifted by two bits minus the remainder biasing factor, and a fourth (e.g., highest) division threshold may be equal to number of pixels left shifted by three bits minus the remainder biasing factor The controller 40 may then determine whether the absolute value of the sum of differences is greater than the highest division threshold (decision block 178). When greater than the highest division threshold, the controller 40 may set the central offset candidate to a maximum or minimum value based on sign of the sum of differences (process block 180). For example, when image data is 10-bits, the controller 40 may set the central offset candidate to 31 when the sign is positive and −31 when the sign is negative. Additionally, when the image data is 8-bits, the controller 40 may set the central offset candidate to 7 when the sign is positive and −7 when the sign is negative.

On the other hand, when not greater than the highest division threshold, the controller 40 may determine whether the absolute value of the sum of differences is greater than a next division threshold (decision block 182). In some embodiments, the controller 40 may progressively evaluate the division thresholds in descending order from the highest division threshold to the lowest division threshold. As such, after comparing the absolute value of the sum of differences to the next division threshold, the controller 40 may determine whether additional division thresholds remain (decision block 188).

When the absolute value of the sum of differences is greater than a division threshold, the controller 40 may add a power two to the division offset (process block 184). For example, when the image data is 10-bits, the controller 40 may add sixteen (e.g., two to the power of four) when greater than the fifth division threshold, eight (e.g., two to the power of three) when greater than the fourth division threshold, four (e.g., two to the power of two) when greater than the third division threshold, two (e.g., two to the power of one) when greater than the second division threshold, and one (e.g., two to the power of zero) when greater than the first division threshold. Additionally, when the image data is 8 bits, the controller 40 may add four (e.g., two to the power of two) when greater than the third division threshold, two (e.g., two to the power of one) when greater than the second division threshold, and one (e.g., two to the power of zero) when greater than the first division threshold.

Additionally, when the absolute value of the sum of differences is greater than a division threshold, the controller 40 may subtract the division threshold from the absolute value of the sum of differences (process block 186). For example, the controller 40 may subtract value of the fifth division threshold when greater than the fifth division threshold, value of the fourth division threshold when greater than the fourth division threshold. Additionally, the controller 40 may subtract value of the third division threshold when greater than the third division threshold, value of the second division threshold when greater than the second division threshold, and value of the first division threshold when greater than the first division threshold.

After the controller 40 determines that no additional division thresholds remain, the controller 40 may set the central offset based on the division offset and the sign of the sum of differences (process block 190). For example, when the sign is positive, the controller 40 may set the central offset candidate equal to the division offset. On the other hand, when the sign is negative, the controller 40 may set the central offset candidate equal to the additive inverse of the division offset. In this manner, the controller 40 may determine a central band offset candidate.

Returning to the process 150 described in FIG. 13, the controller 40 may use the band offset statistics block 110 to determine a set of band offset candidates based on the central band offset candidate (process block 158). To facilitate determining the set of band offset candidates, the band offset statistics block 110 may determine criteria used to select the other band offset candidates in relation to the central band offset candidate. In some embodiments, the criteria may indicate a range around the central band offset candidate from which integer values are selected as band offset candidates. For example, when the range is +/−3 around the central band offset candidate and the central band offset candidate is 1, the other band offset candidates may be −2, −1, 0, 2, 3, and 4.

Additionally, in some embodiments, the criteria may indicate a maximum and/or a minimum band offset value. In some embodiments, the maximum and/or minimum band offset value may be set to exclude band offset candidates that would otherwise fall within the range around the central band offset candidate, for example, to restrict selection of large band offset candidates. Continuing with the above example, a maximum band offset value may be set at 3, thereby restricting selection of band offset candidates greater than three (e.g., 4, 5, 6, etc.). As such, the band offset candidates may be clipped to −2, −1, 0, 1, 2, and 3.

The controller 40 may then use the band offset statistics block 110 to determine a rate-distortion cost associated with each band offset candidate for the band classification (process block 160). In some embodiments, the rate-distortion cost may be determined using equation (1). Thus, in such embodiments, the band offset statistics block 110 may determine the rate-distortion cost associated with a band offset candidate based at least in part on rate (e.g., number of bits) expected to be used to indicate the band offset candidate and a distortion metric (e.g., sum of absolute difference or sum of squared difference) that indicates distortion expected to result when the band offset candidate is applied to decoded image data.

Based at least in part on the rate-distortion costs, the controller 40 may use the band offset statistics block 110 to select a band offset from the set of band offset candidates and associate the band offset with the band classification (process block 162). In a similar manner, the band offset statistics block 110 may determine a band offset to associate with each possible band classification.

As such, computational complexity of determining the band offset statistics may be dependent at least in part on number of band offset candidates selected. Additionally, average quality of the band offsets selected may also be dependent at least in part on number of band offset candidates selected. Thus, in some embodiments, criteria (e.g., range around the central band offset candidate) used to select the set of band offset candidates may be dynamically adjusted. For example, to facilitate reducing computational complexity, the range may be reduced to +/−2 around the central band offset candidate. On the other hand, to facilitate improving average quality (e.g., reducing average rate-distortion cost), the range may be increased to +/−4 around the central band offset candidate.

Returning to the process 116 described in FIG. 11, the controller 40 may use the edge offset statistics block 112 to determine edge offset statistics (process block 124). In some embodiments, the edge offset statistics may be determined substantially in parallel with the band offset statistics since they are relatively independent. Additionally, in some embodiments, the edge offset statistics may include mapping between possible edge classifications and corresponding edge offsets, which may be applied to decoded image data that falls within the edge class. As described above, an edge classification may include an edge class and category pair. In some embodiments, the edge class may indicate direction of an edge (e.g., line or boundary), for example, whether zero degrees (e.g., horizontal), forty-five degrees, ninety degrees (e.g., vertical), or one-hundred thirty-five degrees.

Additionally, the category may indicate magnitude of a pixel along an edge relative to adjacent pixels along the edge. For example, a pixel may be categorized in a first category when magnitude is less than both adjacent pixels, a second category when magnitude is less than one adjacent pixel and equal to the other adjacent pixel, a third category when magnitude is greater than one adjacent pixel and equal to the other adjacent pixel, and a fourth category when magnitude is greater than both adjacent pixels. Thus, in some embodiments, there may be sixteen possible edge classifications (e.g., four edge classes with four categories each). To determine the mapping, the edge offset statistics block 112 may analyze the edge offset sample to determine edge offset value to associate with each of the edge classifications.

Figure 15:
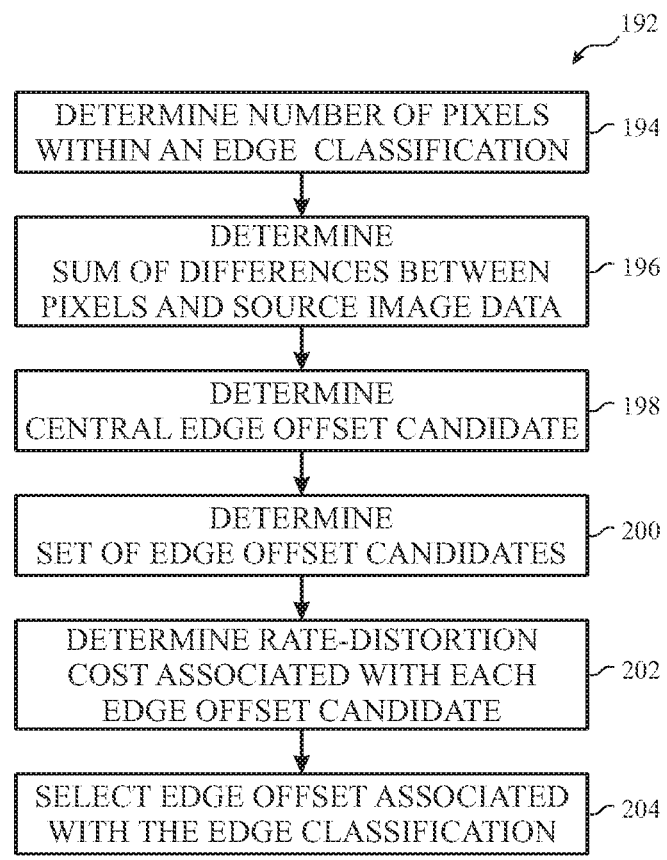
FIG. 15 is a flow diagram of a process for operating the edge offset statistics block of FIG. 10, in accordance with an embodiment.

To help illustrate, one embodiment of a process 192 describing operation of the edge offset statistics block 112 is presented in FIG. 15. Generally, the process 192 includes determining number of pixels with an edge classification (process block 194), determining a sum of differences between the pixels and source image data (process block 196), determining a central edge offset candidate (process block 198), determining a set of edge offset candidates (process block 200), determining a rate-distortion cost associated with each edge offset candidate (process block 202), and selecting an edge offset to associate with the edge classification (process block 204). In some embodiments, the process 192 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the edge offset statistics block 112 to determine number of pixels in the edge offset sample that fall within an edge classification (process block 194). For example, the edge offset statistics block 112 may progress through the image data corresponding with each pixel in the edge offset sample and determine whether the pixel is part of an edge and, if so, the edge class (e.g., direction) and category (e.g., magnitude in relation to adjacent pixels along the edge). In some embodiments, the edge offset statistics block 112 may increment a counter each time a pixel falls within the edge classification.

Additionally, the controller 40 may use the edge offset statistics block 112 to determine a sum of differences between the pixels that fall within the edge classification and corresponding (e.g., co-located) source image data (process block 196). In some embodiments, the edge offset statistics block 112 may determine difference between image data within the edge offset sample that falls within the edge classification and co-located source image data. To determine the sum of differences, the edge offset statistics block 112 may add together the difference determined for each pixel in the edge offset sample that falls within the edge classification.

Based on number of pixels that fall within the edge classification and the sum of differences, the controller 40 may use the edge offset statistics block 112 to determine a central edge offset candidate (process block 198). In some embodiments, the edge offset statistics block 112 may determine the central edge offset candidate by dividing the sum of differences by the number of pixels. In other embodiments, the edge offset statistics block 112 may instead determine the central edge offset candidate using addition, subtraction, and shit operations, for example, using the process 164 described in FIG. 14. In such embodiments, computational complexity for determining the central edge offset candidate may be reduced, which may facilitate reducing circuitry used to implement the video encoding pipeline 34.

Based on the central edge offset candidate, the controller 40 may use the edge offset statistics block 112 to determine a set of edge offset candidates (process block 200). To facilitate determining the set of edge offset candidates, the edge offset statistics block 112 may determine criteria used to select the other edge offset candidates in relation to the central edge offset candidate. In some embodiments, the criteria may indicate a range around the central edge offset candidate from which integer values are selected as edge offset candidates. For example, when the is +/−3 around the central edge offset candidate and the central edge offset candidate is 1, the other edge offset candidates may be −2, −1, 0, 2, 3, and 4.

Additionally, in some embodiments, the criteria may indicate a maximum and/or a minimum edge offset value. In some embodiments, the maximum and/or minimum edge offset value may be set to exclude edge offset candidates that would otherwise fall within the range around the central edge offset candidate, for example, to restrict selection of large edge offset candidates. Continuing with the above example, a maximum edge offset value may be set at 3, thereby restricting selection of edge offset candidates greater than three (e.g., 4, 5, 6, etc.). As such, the edge offset candidates may be clipped to −2, −1, 0, 1, 2, and 3. Additionally, in some embodiments, the maximum and/or minimum values of the band offset and edge offset values criteria may be independently adjusted and, thus, vary.

The controller 40 may then use the edge offset statistics block 112 to determine a rate-distortion cost associated with each edge offset candidate for the edge classification (process block 202). In some embodiments, the rate-distortion cost may be determined using equation (1). Thus, in such embodiments, the edge offset statistics block 112 may determine the rate-distortion cost associated with an edge offset candidate based at least in part on rate (e.g., number of bits) expected to be used to indicate the edge offset candidate and a distortion metric (e.g., sum of absolute difference or sum of squared difference) that indicates distortion expected to result when the edge offset candidate is applied to decoded image data.

Based at least in part on the rate-distortion costs, the controller 40 may use the edge offset statistics block 112 to select an edge offset from the set of edge offset candidates and associate the edge offset with the edge classification (process block 204). In a similar manner, the edge offset statistics block 112 may determine an edge offset to associate with each possible edge classification.

As such, computational complexity of determining the edge offset statistics may be dependent at least in part on number of edge offset candidates selected. Additionally, average quality of the edge offsets selected may also be dependent at least in part on number of edge offset candidates selected. Thus, in some embodiments, criteria (e.g., range around the central edge offset candidate) used to select the set of edge offset candidates may be dynamically adjusted. For example, to facilitate reducing computational complexity, the range may be reduced to +/−2 around the central edge offset candidate. On the other hand, to facilitate improving average quality (e.g., reducing average rate-distortion cost), the range may be increase to +/−4 around the central edge offset candidate. Additionally, in some embodiments, the criteria used to the select the edge offset candidates and the criteria used to select the band offset candidates may be independently adjusted and, thus, vary.

Returning to the process 116 described in FIG. 11, the controller 40 may use the sample adaptive offset mode decision block 114 to determine an explicit rate-distortion cost associated with sample adaptive offset parameters determined based on the edge offset statistics and/or the band offset statistics (process block 128). In some embodiments, the explicit rate-distortion cost may be based at least in part on explicit sample adaptive offset parameters selected for a luma component of the coding unit and explicit sample adaptive offset parameters selected for chroma components of the coding unit.

Figure 16:
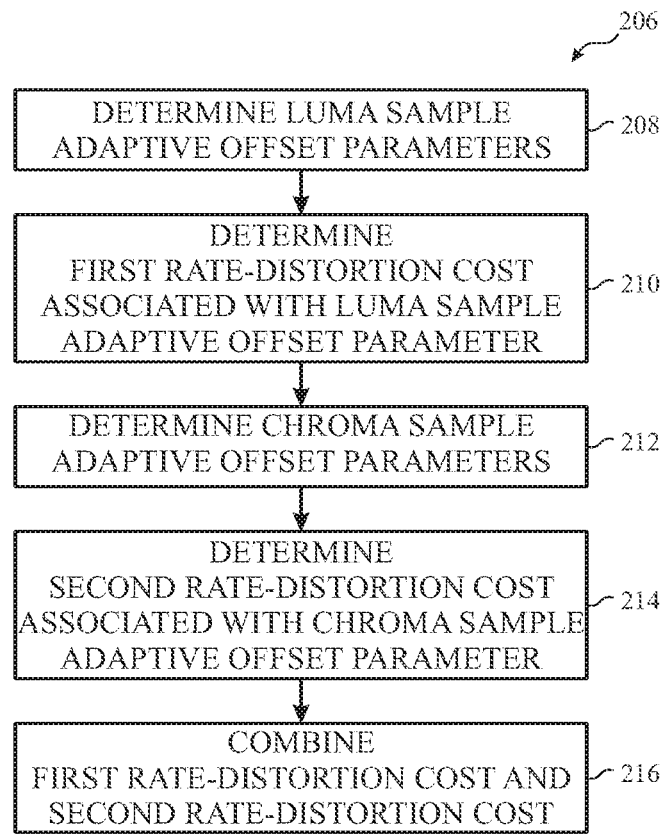
FIG. 16 is a flow diagram of a process for operating the sample adaptive offset mode decision block of FIG. 10, in accordance with an embodiment.

To help illustrate, one embodiment of a process 206 for determining the explicit rate-distortion cost is described in FIG. 16. Generally, the process 206 includes determining luma sample adaptive offset parameters (process block 208), determining a first rate-distortion cost associated with the luma sample adaptive offset parameters (process block 210), determining chroma sample adaptive offset parameters (process block 212), determining a second rate-distortion cost associated with the chroma sample adaptive offset parameters (process block 212), and combining the first rate-distortion cost and the second rate-distortion cost (process block 214). In some embodiments, the process 206 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the sample adaptive offset mode decision block 114 to determine luma sample adaptive offset parameters (process block 208) and a first rate-distortion cost associated with the luma sample adaptive offset parameters (process block 210). In some embodiments, the sample adaptive offset estimation block 78 may select the luma sample adaptive offset parameters from multiple candidates, which may include luma edge offset parameters, luma band offset parameters, and offset off parameters. More specifically, the sample adaptive offset estimation block 78 may select the luma sample adaptive offset parameters from multiple candidates based at least in part on associated rate distortion costs.

Figure 17:
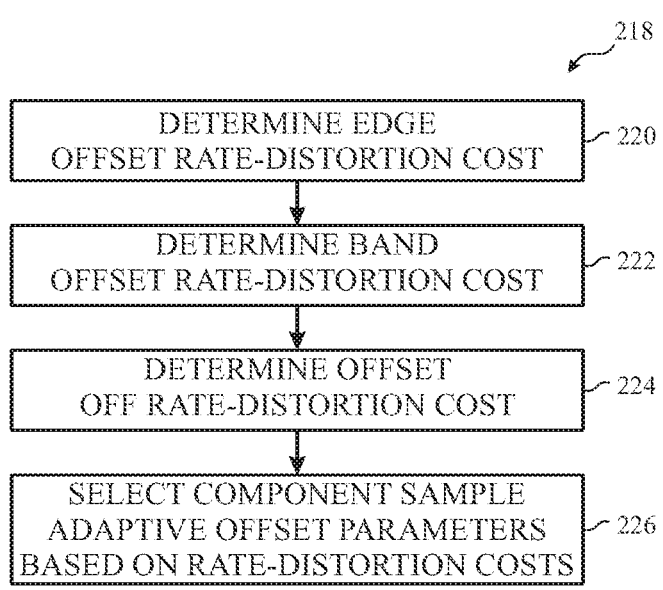
FIG. 17 is a flow diagram of a process for determining component (e.g., luma or chroma) sample adaptive offset parameter, in accordance with an embodiment.

To help illustrate, one embodiment of a process 218 for determining sample adaptive offset parameters of a component (e.g., the luma component or the chroma components) is described in FIG. 17. Generally, the process 218 includes determining an edge offset rate-distortion cost (process block 220), determining a band offset rate-distortion cost (process block 222), determining an offset off rate-distortion cost (process block 224), and selecting component sample adaptive parameters based on the rate-distortion costs (process block 226). In some embodiments, the process 218 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the sample adaptive offset mode decision block 114 to determine an edge offset rate-distortion cost associated with a component (e.g., luma component or chroma components) of image data (process block 220). More specifically, the edge offset rate-distortion cost may be the rate-distortion cost associated with component edge offset parameters. In other words, the edge offset rate-distortion cost may be determined based on the edge offset parameters selected for the component.

Figure 18:
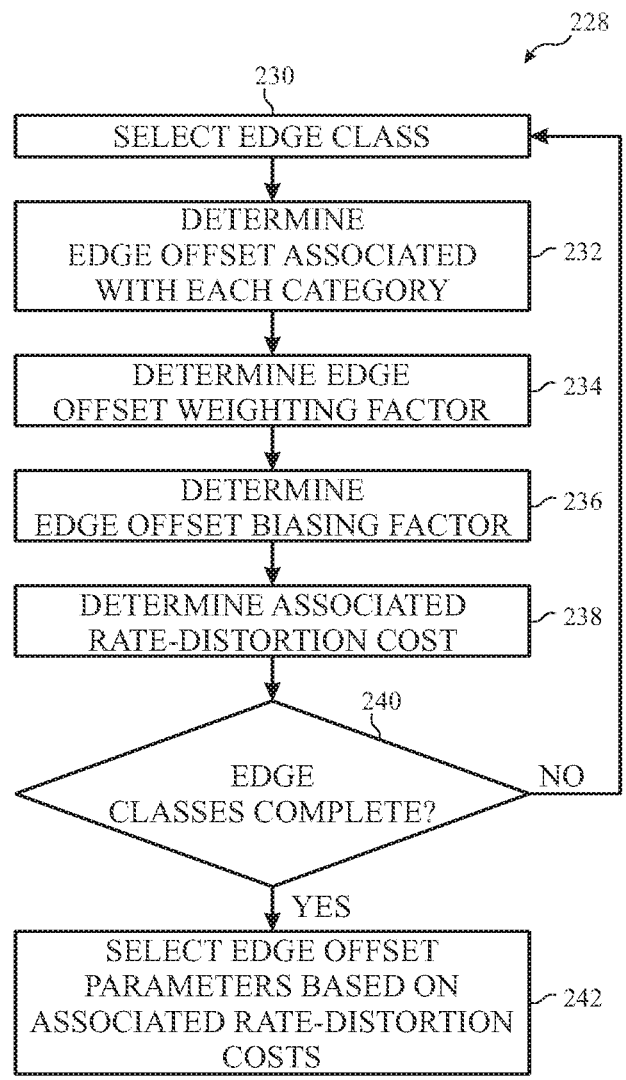
FIG. 18 is a flow diagram of a process for determining component edge offset parameters, in accordance with an embodiment.

One embodiment of a process 228 for determining component (e.g., luma or chroma) edge offset parameters is described in FIG. 18. Generally, the process 228 includes selecting an edge class (process block 230), determine edge offsets associated with each category of the edge class (process block 232), determining an edge offset weighting factor (process block 234), determining an edge offset biasing factor (process block 236), determining an associated rate-distortion cost (process block 238), determining whether each edge class has been evaluated (decision block 240), and selecting component edge offset parameters corresponding to a single edge class based on associated rate-distortion costs (process block 242). In some embodiments, the process 228 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the sample adaptive offset mode decision block 114 to select an edge class (process block 230). Additionally, the controller 40 may use the sample adaptive offset mode decision block 114 to determine an edge offset associated with each category of the edge class (process block 232). As described above, the edge offset statistics may include a mapping of each possible edge classifications (e.g., edge class and category pair) to a corresponding edge offset. Thus, the sample adaptive offset mode decision block 114 may determine the edge offsets based at least in part on the edge offset statistics.

Additionally, the controller 40 may use the sample adaptive offset mode decision block 114 to determine an edge offset weighting factor (process block 234). In some embodiments, the sample adaptive offset mode decision block 114 may dynamically adjust the edge offset weighting factor based at least in part on desired quality of an image frame displayed based on decoded image data. For example, the sample adaptive offset block 78 may adjust the edge offset weighting factor based on a quantization parameter used by the video encoding pipeline 34 to generate encoded image data corresponding with the coding unit. In some embodiments, the coding unit (e.g., a coding tree unit) may include multiple smaller coding units, which has its own quantization parameter. In such embodiments, the sample adaptive offset block 78 may adjust the edge offset weighting factor based on an average of the quantization parameters of the smaller coding units. Additionally or alternatively, in such embodiments, the sample adaptive offset block 78 may adjust the edge offset weighting factor based on the quantization parameter of a single (e.g., lead or first) coding unit.

Furthermore, the controller 40 may use the sample adaptive offset estimation block 78 to determine an edge offset biasing factor (process block 236). In some embodiments the sample adaptive offset estimation block 78 may dynamically adjust the edge offset biasing factor based on characteristics of the source image data corresponding with the coding unit. For example, when likelihood of visual artifacts that may be compensated by applying edge offsets increases (e.g., when number of edges increases), the sample adaptive estimation block 78 may reduce the edge offset biasing factor to bias toward selection of edge offset parameters.

Based at least in part on the edge offset weighting factor and the edge offset biasing factor, the controller 40 may use the sample adaptive offset estimation block 78 to determine a rate-distortion cost associated with the edge offset parameter candidate (e.g., mapping of group of edge classifications to the edge offsets) (process block 238). In some embodiments, the rate-distortion cost may be determined using equation (1). Thus, in such embodiments, the sample adaptive offset mode decision block 114 may determine the rate-distortion cost associated with an edge offset parameter candidate based at least in part on rate (e.g., number of bits) expected to be used to indicate the edge offset parameter candidate and a distortion metric (e.g., sum of absolute difference or sum of squared difference) that indicates distortion expected to result when the edge offset parameter candidate is applied to decoded image data. Additionally, when the same edge offset weighting factor and edge offset biasing factor are used, the sample adaptive offset mode decision block 114 may determine the rate-distortion cost as a sum of the corresponding rate-distortion costs used to determine the edge offset statistics.

The controller 40 may then use the sample adaptive offset mode decision block 114 to determine whether each edge class has been analyzed (decision block 240). When each edge class has not been analyzed, the controller 40 may use the sample adaptive offset mode decision block 114 to select a next edge class (process block 230) and so on. In some embodiments, the sample adaptive offset mode decision block 114 may progress through the edge classes in a fixed order. For example, the sample adaptive offset mode decision block 114 may analyze the zero degree edge class, followed by the forty-five degree edge class, followed by the ninety degree edge class, and followed by the one-hundred thirty-five degree edge class. In such embodiments, the sample adaptive offset estimation block 78 may determine that each edge class has been analyzed after the one-hundred thirty-five degree edge class has been analyzed.

Based on the rate-distortion cost associated with each edge offset parameter candidate, the controller 40 may use the sample adaptive offset mode decision block 114 to select component (e.g., luma or chroma) edge offset parameters (process block 242). In some embodiments, the edge offset parameters may indicate edge class for which to apply edge offsets and value of the edge offsets based on category. Additionally, when rate-distortion cost is determined using equation (1), the sample adaptive offset mode decision block 114 may select the edge offset parameters with the lowest associated rate-distortion cost from the multiple candidates. In this manner, the sample adaptive offset mode decision block 114 may determine the edge offset rate-distortion cost associated with the component.

Returning to the process 218 described in FIG. 17, the sample adaptive offset estimation block 78 may also determine a band offset rate-distortion cost associated with the component (process block 222). More specifically, the band offset rate-distortion cost may be the rate-distortion cost associated with band offset parameters selected for the component. In other words, the band offset rate-distortion cost may be determined based on the band offset parameters selected for the component.

Figure 19:
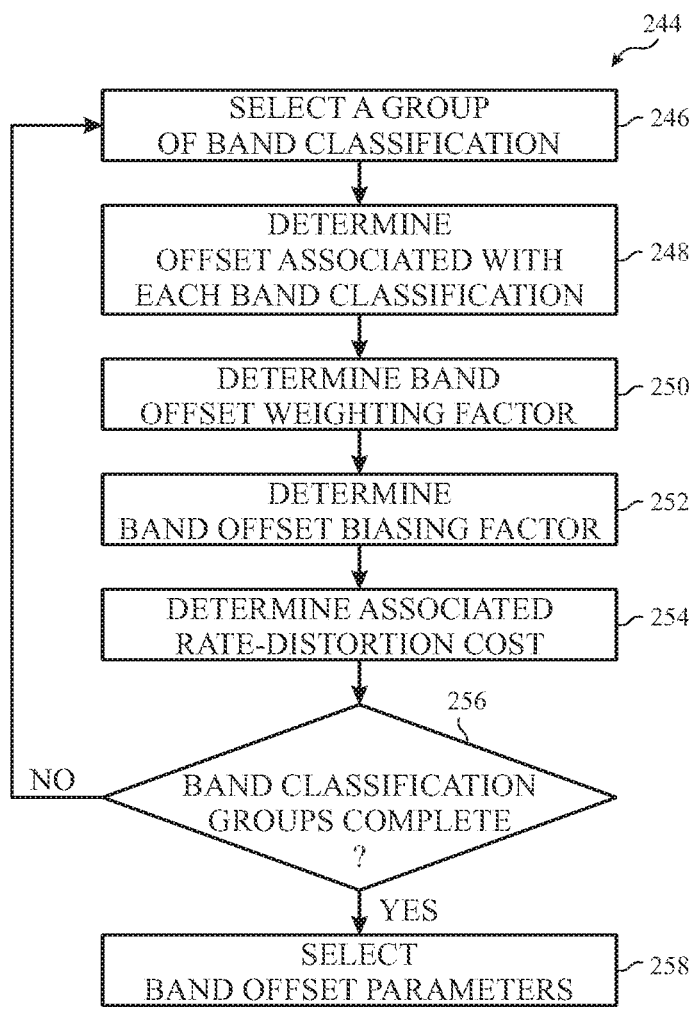
FIG. 19 is a flow diagram of a process for determining component band offset parameters, in accordance with an embodiment.

To help illustrate, one embodiment of a process 244 for determining component (e.g., luma or chroma) band offset parameters is described in FIG. 19. Generally, the process 244 includes selecting a group of band classifications (process block 246), determining a band offset associated with each band classification in the group (process block 248), determining a band offset weighting factor (process block 250), determining a band offset biasing factor (process block 252), determining an associated rate-distortion cost (process block 254), determining whether each group of band classifications has been evaluated (decision block 256), and selecting component band offset parameters based on associated rate-distortion costs (process block 258). In some embodiments, the process 244 may be implemented by executing instructions stored in a tangible, non-transitory, computer-readable medium, such as the controller memory 44, the local memory 20, the main memory storage device 22, or the like, using processing circuitry, such as the controller processor 42, the processor core complex 18, a graphics processing unit (GPU), or the like.

Accordingly, in some embodiments, the controller 40 may use the sample adaptive offset mode decision block 114 to select a group of band classifications (process block 246). In some embodiments, the sample adaptive offset estimation block 78 may select the group as four consecutive band classifications. For example, the group may include band classification zero, band classification one, band classification two, and band classification three.

Additionally, the controller 40 may use the sample adaptive offset mode decision block 114 to determine a band offset associated with each band classification in the group (process block 248). As described above, the band offset statistics may include a mapping of each possible band classification to a corresponding band offset. Thus, the sample adaptive offset mode decision 114 may determine the band offsets based at least in part on the band offset statistics.

Additionally, the controller 40 may use the sample adaptive offset mode decision block 114 to determine a band offset weighting factor (process block 250). In some embodiments, the sample adaptive offset mode decision block 114 may dynamically adjust the band offset weighting factor based at least in part on desired quality of an image frame displayed based on decoded image data. For example, the sample adaptive offset mode decision block 114 may adjust the band offset weighting factor based on a quantization parameter used by the video encoding pipeline 34 to generate encoded image data corresponding with the coding unit. Additionally, in some embodiments, the band offset weighting factor may be different from the edge offset weighting factor.

Furthermore, the controller 40 may use the sample adaptive offset mode decision block 114 to determine a band offset biasing factor (process block 252). In some embodiments the sample adaptive offset mode decision block 114 may dynamically adjust the band offset biasing factor based on characteristics of the source image data corresponding with the coding unit. For example, when likelihood of visual artifacts that may be compensated by band offsets increases (e.g., coding unit includes sky), the sample adaptive estimation block 78 may reduce the band offset biasing factor to bias toward selection of band offset parameters.

Based at least in part on the band offset weighting factor and the band offset biasing factor, the controller 40 may use the sample adaptive offset mode decision block 114 to determine a rate-distortion cost associated with the band offset parameter candidate (e.g., mapping of group of band classifications to the band offsets) (process block 254). In some embodiments, the rate-distortion cost may be determined using equation (1). Thus, in such embodiments, the sample adaptive offset mode decision block 114 may determine the rate-distortion cost associated with a band offset parameter candidate based at least in part on rate (e.g., number of bits) expected to be used to indicate the band offset parameter candidate and a distortion metric (e.g., sum of absolute difference or sum of squared difference) that indicates distortion expected to result when the band offset parameter candidate is applied to decoded image data. Additionally, when the same band offset weighting factor and band offset biasing factor are used, the sample adaptive offset mode decision block 114 may determine the rate-distortion cost as a sum of the corresponding rate-distortion costs used to determine the band offset statistics.

The controller 40 may then use the sample adaptive offset mode decision block 114 to determine each group of band classifications has been analyzed (decision block 256). When each band classification has not been analyzed, the controller 40 may use the sample adaptive offset mode decision block 114 to select a next group of band classifications (process block 248) and so on. In some embodiments, the sample adaptive offset mode decision block 114 may progress through the band classifications in a fixed order. For example, the sample adaptive offset estimation block 78 may analyze a group including band classification zero to band classification three, followed by a group including band classification one to band classification four, followed by a group including band classification two to band classification five, and so on to a group including band classification twenty-eight to band classification thirty-one. In such embodiments, the rate-distortion cost associated with a band classification may be reused in determining rate-distortion cost associated with multiple groups of band classifications. Additionally, in such embodiments, the sample adaptive offset estimation block 78 may determine that each band classification group has been analyzed after a group including band classification thirty-one has been analyzed.

In other embodiments, other band classification groups may wrap around from band classification thirty-one to band classification zero. For example, in such embodiments, the sample adaptive offset estimation block 78 may analyze a group including band classification twenty-nine, band classification thirty, band classification thirty-one, and band classification zero. Additionally, the sample adaptive offset estimation block 78 may analyze a group including band classification thirty, band classification thirty-one, band classification zero, and band classification one. In such embodiments, the sample adaptive offset estimation block 78 may determine that each band classification group has been analyzed after a specific number (e.g., four) of band classification groups including band classification thirty-one have been analyzed.

Based on the rate-distortion cost associated with each band offset parameter candidate, the controller 40 may use the sample adaptive offset mode decision block 114 to select component (e.g., luma or chroma) band offset parameters (process block 242). In some embodiments, the band offset parameters may indicate group of band classifications for which to apply band offsets and value of the band offsets based on band classification. Additionally, when rate-distortion cost is determined using equation (1), the sample adaptive offset mode decision block 114 may select the band offset parameters with the lowest associated rate-distortion cost from the multiple candidates. In this manner, the sample adaptive offset mode decision block 114 may determine the band offset rate-distortion cost for the component.

Returning to the process 222 described in FIG. 17, the controller 40 may use the sample adaptive offset mode decision block 114 to determine an offset off rate-distortion cost (process block 224). In some embodiments, the offset off rate-distortion cost may be the rate-distortion cost when sample adaptive offsets are not applied to the decoded image data. Additionally, in some embodiments, the offset off rate-distortion cost may also be determined using equation (1).

The controller 40 may then use the sample adaptive offset mode decision block 114 to select component (e.g., luma or chroma) sample adaptive offset parameters based at least in part on the edge offset rate-distortion cost, the band offset rate-distortion cost, and the offset off rate-distortion cost (process block 226). In other words, the sample adaptive offset mode decision block 114 may select the component sample adaptive offset parameters as one of the component edge offset parameters, the component band offset parameters, or offset off parameters. In this manner, the sample adaptive offset mode decision block 114 may determine luma sample adaptive offset parameters and the first rate-distortion cost.

Returning to the process 206 described in FIG. 16, the controller 40 may also use the sample adaptive offset mode decision block 114 to determine chroma sample adaptive offset parameters (process block 212) and a second rate-distortion cost associate with the chroma sample adaptive offset parameters (process block 214). Similar to the luma component, the sample adaptive offset mode decision block 114 may determine chroma edge offset parameters and associated edge offset rate-distortion cost using the process 228 described in FIG. 18. In some embodiments, the same chroma edge offset parameters may be selected for multiple chroma components (e.g., Cr and Cb). In other embodiments, different chroma edge offset parameters may be selected for the multiple chroma components. For example, first chroma edge offset parameters that indicate edge offsets for categories of a first edge class may be selected for a first (e.g., Cr) chroma component and second chroma edge offset parameters that indicate edge offsets for categories of a second edge class may be selected for a second (e.g. Cb) chroma component.

Additionally, the sample adaptive offset mode decision block 114 may determine chroma band offset parameters and associated band offset rate-distortion cost using the process 244 described in FIG. 19. In some embodiments, the same chroma band offset parameters may be selected for multiple chroma components (e.g., Cr and Cb). In other embodiments, different chroma band offset parameters may be selected for the multiple chroma components. For example, first chroma band offset parameters that indicate band offsets for a first group of band classifications may be selected for the first (e.g., Cr) chroma component and second chroma band offset parameters that indicate band offsets for a second group of band classifications may be selected for the second (e.g. Cb) chroma component.

Furthermore, the sample adaptive offset mode decision block 114 may select the chroma sample adaptive offset parameters (e.g., from one of the chroma edge offset parameters, the chroma band offset parameters, and the chroma offset off parameters) and the second rate-distortion cost associated using the process 218 described in FIG. 17. In some embodiments, the same chroma sample adaptive offset parameters may be selected for multiple chroma components (e.g., Cr and Cb). In other embodiments, different chroma sample adaptive offset parameters may be selected for the multiple chroma components.

Returning to the process 116 described in FIG. 11, the controller 40 may use the sample adaptive offset mode decision block 114 to combine the first rate-distortion cost and the second rate-distortion cost to determine the explicit rate-distortion cost (process block 130). In some embodiments, the explicit rate-distortion cost may be determined by adding together the first rate-distortion cost and the second rate-distortion cost. As such, the explicit sample adaptive parameters may include the luma sample adaptive offset parameters determined based at least in part on the edge offset statistics and the chroma sample adaptive offset parameters determined based at least in part on the band offset statistics.

Additionally, the controller 40 may use the sample adaptive offset mode decision block 114 to determine a merge rate-distortion cost associated with merge sample adaptive offset parameters (process block 132). In some embodiments, the merge sample adaptive offset parameters may be the sample adaptive offset parameters selected for a neighboring (e.g., top neighboring or left neighboring) coding unit. Additionally, in some embodiments, the merge rate-distortion cost may be determined using equation (1). Thus, in such embodiments, the sample adaptive offset mode decision block 114 may determine the merge rate-distortion cost associated with the merge sample adaptive offset parameters based at least in part on rate (e.g., number of bits) expected to be used to indicate use of neighboring sample adaptive offset parameters and a distortion metric (e.g., sum of absolute difference or sum of squared difference) that indicates distortion expected to result when the merge sample adaptive offset parameters are applied to decoded image data.

Based at least in part on the explicit rate-distortion cost and the merge rate-distortion cost, the sample adaptive offset mode decision block 114 may determine whether to use the explicit sample adaptive offset parameters or the merge sample adaptive offset parameters. As described above, the explicit sample adaptive offset parameters may be determined based at least in part on the edge offset statistics and the chroma sample adaptive offset parameters determined based at least in part on the band offset statistics. Additionally, as described above, the merge sample adaptive offset parameters may be selected from merge up sample adaptive offset parameters and/or merge left sample adaptive offset parameters. As such, the sample adaptive mode decision block 114 may select sample adaptive offset parameters to apply to decoded image data corresponding with the coding unit by selecting one of the band offset parameters, the edge offset parameters, the offset off parameters, the merge up sample adaptive offset parameters, and/or the merge left sample adaptive offset parameters based on associated rate-distortion costs.

Accordingly, the technical effects of the present disclosure include reducing computational complexity of determining sample adaptive offset parameters, which may facilitate reducing operating duration of a video encoding pipeline and/or circuitry used to implement the video encoding pipeline. For example, computational complexity may be reduced by reducing amount of image data analyzed to determine sample adaptive offset parameters. Additionally, the technical effects of the present disclosure include improve quality/reliability (e.g., ability to reduce likelihood of perceivable visual artifacts) of sample adaptive offset parameters. For example, quality of the sample adaptive offset parameters may be improved by enabling different offset samples to be used to determine edge offset statistics and band offset statistics. Additionally, quality of the sample adaptive offset parameters may be improved by enabling size, location, and/or shape of offset samples used to determine the offset statistics to be dynamically adjusted, for example, to select an important portion and/or exclude a noisy portion. Furthermore, quality of the sample adaptive offset parameters may be improved by enabling selection criteria (e.g., rate-distortion cost) to be dynamically adjusted, for example, to bias toward edge offset parameters or band offset parameters based on variations expected to occur in the decoding image data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A tangible, non-transitory, computer-readable medium configured to store instructions executable by one or more processors in a video encoding pipeline, wherein the instructions comprise instructions to:
   determine an offset sample, wherein determining the offset sample comprises:
      determining, using the one or more processors, local statistics of source image data corresponding with a coding unit;
      determining a first portion of the coding unit expected to be representative of a majority of the coding unit based at least in part on a noise estimation of the local statistics of the source image data; and
      dynamically adjusting, using the one or more processors, size, location, shape, or any combination thereof of the offset sample selected in the coding unit based at least in part on the local statistics of the source image data to include the first portion of the coding unit;
   determine, using the one or more processors, sample adaptive offset parameters based at least in part on analysis of the offset sample; and
   communicate, using the one or more processors, the sample adaptive offset parameters to a decoding device to enable the decoding device to apply the sample adaptive offset parameters to decoded image data.

2. The computer-readable medium of claim 1, wherein the instructions to determine the sample adaptive offset parameters comprise instructions to:
   determine edge offset parameters based at least in part on an edge offset sample, wherein the offset sample comprises the edge offset sample, and the edge offset parameters comprise a first mapping of an edge classification to a corresponding edge offset value;
   determine band offset parameters based at least in part on a band offset sample, wherein the offset sample comprises the band offset sample, the band offset parameters comprise a second mapping of a band classification to a corresponding band offset value, and the band offset sample comprises a different size, shape, location, or any combination thereof compared to the edge offset sample; and
   select the sample adaptive offset parameters from a plurality of candidates comprising the edge offset parameters and the band offset parameters based at least in part on a first offset rate-distortion cost associated with the edge offset parameters and a second offset rate-distortion cost associated with the band offset parameters.

3. The computer-readable medium of claim 2, comprising instructions to:
   determine a second portion of the coding unit where a perceivable ringing artifact is expected to occur;
   select the edge offset sample to include the second portion of the coding unit;
   determine a third portion of the coding unit where a perceivable banding artifact is expected to occur, wherein the second portion of the coding unit is different from the third portion of the coding unit; and
   select the band offset sample to include the third portion of the coding unit.

4. The computer-readable medium of claim 2, wherein:
   the instructions to determine the edge offset parameters comprise instructions to:
      determine a first plurality of mappings configured to map each of a plurality of edge classifications to a corresponding edge offset value based at least in part on analysis of the edge offset sample;
      determine a plurality of candidate edge offset parameters comprising different subsets of the first plurality of mappings; and
      select the edge offset parameters from the plurality of candidate edge offset parameters based at least in part on associated edge offset rate-distortion costs; and
   the instructions to determine the band offset parameters comprise instruction to:
      determine a second plurality of mappings configured to map each of a plurality of band classifications to a corresponding band offset value based at least in part on analysis of the band offset sample;
      determine a plurality of candidate band offset parameters comprising different subsets of the second plurality of mappings; and
      select the band offset parameters from the plurality of candidate band offset parameters based at least in part on associated band offset rate-distortion costs.

5. The computer-readable medium of claim 1, comprising instructions to:
   determine a second portion of the coding unit expected to differ from the majority of the coding unit based at least in part on the local statistics of the source image data; and
   adjust the size, the shape, the location, or any combination thereof of the offset sample to include the first portion of the coding unit and exclude the second portion of the coding unit.

6. The computer-readable medium of claim 1, wherein:
the offset sample comprises a plurality of 8×8 samples of image data corresponding with the coding unit;
the image data comprises deblocked image data corresponding with a first portion of the coding unit and reconstructed image data corresponding with a second portion of the coding unit; and
the offset sample comprises the deblocked image data and the reconstructed image data.

7. The computer-readable medium of claim 1, wherein the local statistics comprises an average luminance amplitude, an average chroma amplitude, a variance, an indication of variance of the source image data, an indication of texture of the source image data, a gradient of the source image data, or any combination thereof.

8. A computing device comprising a video encoding pipeline configured to encode source image data, wherein the video encoding pipeline comprises a sample adaptive offset block configured to:
determine an offset sample, wherein determining the offset sample comprises:
determining local statistics of the source image data corresponding with a coding unit; and
dynamically adjusting size, location, shape, or any combination thereof of the offset sample selected in the coding unit based at least in part on the local statistics of the source image data;
dynamically adjust an edge offset biasing factor based at least in part on characteristics of the source image data;
determine a quantization parameter used by the video encoding pipeline to encode the source image data;
dynamically adjust an edge offset weighting factor based at least in part on the quantization parameter;
determine a first rate-distortion cost associated with edge offset parameters based at least in part on the edge offset weighting factor and the edge offset biasing factor;
determine sample adaptive offset parameters comprising the edge offset parameters based at least in part on analysis of the offset sample, wherein determining the sample adaptive offset parameters comprises selecting the sample adaptive offset parameters from a plurality of candidates comprising the edge offset parameters based at least in part on the first rate-distortion cost; and
communicate the sample adaptive offset parameters to a decoding device to enable the decoding device to apply the sample adaptive offset parameters to decoded image data.

9. The computing device of claim 8, wherein the sample adaptive offset block is further configured to:
determine the edge offset parameters based at least in part on an edge offset sample, wherein the offset sample comprises the edge offset sample, and the edge offset parameters comprise a first mapping of an edge classification to a corresponding edge offset value;
determine band offset parameters based at least in part on a band offset sample, wherein the offset sample comprises the band offset sample, the band offset parameters comprise a second mapping of a band classification to a corresponding band offset value, and the band offset sample comprises a different size, shape, location, or any combination thereof compared to the edge offset sample; and
select the sample adaptive offset parameters from the plurality of candidates comprising the edge offset parameters and the band offset parameters based at least in part on the first rate-distortion cost associated with the edge offset parameters and a second offset rate-distortion cost associated with the band offset parameters.

10. The computing device of claim 8, wherein the sample adaptive offset parameters comprise band offset parameters, and wherein the sample adaptive offset block is further configured to:
dynamically adjust a band offset biasing factor based at least in part on characteristics of the source image data;
dynamically adjust a band offset weighting factor based at least in part on the quantization parameter;
determine a second rate-distortion cost associated with the band offset parameters based at least in part on the band offset weighting factor and the band offset biasing factor; and
determine the sample adaptive offset parameters by selecting the sample adaptive offset parameters from the plurality of candidates comprising the edge offset parameters and the band offset parameters based at least in part on the first rate-distortion cost and the second rate-distortion cost.

11. The computing device of claim 8, wherein the offset sample comprises the edge offset sample and a band offset sample, and wherein the sample adaptive offset block is further configured to:
determine a first portion of the coding unit where a perceivable ringing artifact is expected to occur;
select the edge offset sample to include the first portion of the coding unit;
determine a second portion of the coding unit where a perceivable banding artifact is expected to occur, wherein the first portion of the coding unit is different from the second portion of the coding unit; and
select the band offset sample to include the second portion of the coding unit.

12. The computing device of claim 8, wherein the sample adaptive offset block is further configured to:
determine a first portion of the coding unit expected to be representative of a majority of the coding unit based at least in part on the local statistics of the source image data;
determine a second portion of the coding unit expected to differ from the majority of the coding unit based at least in part on the local statistics of the source image data; and
adjust the size, the shape, the location, or any combination thereof of the offset sample to include the first portion of the coding unit and exclude the second portion of the coding unit.

13. The computing device of claim 8, wherein the offset sample comprises an edge offset sample and a band offset sample, and wherein:
size of the band offset sample is different from size of the edge offset sample;
location of the band offset sample is different from location of the edge offset sample;
shape of the band offset sample is different from shape of the edge offset sample;
or any combination thereof.

14. The computing device of claim 8, comprising a deblock filtering block configured to determine deblocked image data corresponding with the coding unit, and wherein the offset sample comprises at least a portion of the deblocked image data and at least a portion of reconstructed image data that is not deblocked.

15. The computing device of claim 8, wherein the computing device comprises a portable phone, a media player, a personal data organizer, a handheld game platform, a tablet device, a computer, or any combination thereof.

16. A method comprising:
determining an offset sample, wherein determining the offset sample comprises:
  determining local statistics of source image data corresponding with a coding unit; and
  dynamically adjusting size, location, shape, or any combination thereof of the offset sample selected in the coding unit based at least in part on analysis of the local statistics of the source image data;
determining sample adaptive offset parameters based at least in part on analysis of the offset sample, wherein the sample adaptive offset parameters comprise edge offset parameters;
dynamically adjusting an edge offset biasing factor based at least in part on characteristics of the source image data;
determining a quantization parameter used by a video encoding pipeline to encode the source image data;
dynamically adjusting an edge offset weighting factor based at least in part on the quantization parameter;
determining a first rate-distortion cost associated with the edge offset parameters based at least in part on the edge offset weighting factor and the edge offset biasing factor;
selecting the sample adaptive offset parameters from a plurality of candidates comprising the edge offset parameters based at least in part on the first rate-distortion cost; and
communicating the sample adaptive offset parameters to a decoding device to enable the decoding device to apply the sample adaptive offset parameters to decoded image data.

17. The method of claim 16, wherein the analysis of the local statistics comprises:
determining an amount of perceivable banding artifacts expected to occur in the coding unit;
determining an amount of perceivable ringing artifacts expected to occur in the coding unit; or
both.

18. The method of claim 16, wherein determining the sample adaptive offset parameters comprises:
determining the edge offset parameters based at least in part on an edge offset sample, wherein the offset sample comprises the edge offset sample, and the edge offset parameters comprise a first mapping of an edge classification to a corresponding edge offset value;
determining band offset parameters based at least in part on a band offset sample, wherein the offset sample comprises the band offset sample, the band offset parameters comprise a second mapping of a band classification to a corresponding band offset value; and
selecting the sample adaptive offset parameters from the plurality of candidates comprising the edge offset parameters and the band offset parameters based at least in part on the first rate-distortion cost associated with the edge offset parameters and a second rate-distortion cost associated with the band offset parameters, wherein the first rate-distortion cost and the second rate-distortion cost are based at least in part on the quantization parameter.

19. The method of claim 16, wherein determining the quantization parameter comprises:
determining an average of a plurality of quantization parameters each associated with a smaller coding unit in the coding unit, wherein quantization and inverse quantization is performed on a prediction residual associated with each smaller coding unit based at least in part on an associated quantization parameter; or
selecting a lead quantization parameter from the plurality of quantization parameters.

20. The method of claim 16, wherein the offset sample comprises deblocked image data and reconstructed image data that is not deblocked.

21. A computing device comprising a video encoding pipeline configured to encode source image data, wherein the video encoding pipeline comprises a sample adaptive offset block configured to:
determine an offset sample, wherein determining the offset sample comprises:
  determining local statistics of the source image data corresponding with a coding unit; and
  dynamically adjusting size, location, shape, or any combination thereof of the offset sample selected in the coding unit based at least in part on the local statistics of the source image data;
dynamically adjust a band offset biasing factor based at least in part on characteristics of the source image data;
determine a quantization parameter used by the video encoding pipeline to encode the source image data;
dynamically adjust a band offset weighting factor based at least in part on the quantization parameter;
determine a first rate-distortion cost associated with band offset parameters based at least in part on the band offset weighting factor and the band offset biasing factor;
determine sample adaptive offset parameters comprising the band offset parameters based at least in part on analysis of the offset sample, wherein determining the sample adaptive offset parameters comprises selecting the sample adaptive offset parameters from a plurality of candidates comprising the band offset parameters based at least in part on the first rate-distortion cost; and
communicate the sample adaptive offset parameters to a decoding device to enable the decoding device to apply the sample adaptive offset parameters to decoded image data.

* * * * *